(12) United States Patent
Sethumadhavan et al.

(10) Patent No.: US 11,995,324 B2
(45) Date of Patent: May 28, 2024

(54) METHODS AND SYSTEMS FOR FINE GRANULARITY MEMORY BLACKLISTING TO DETECT MEMORY ACCESS VIOLATIONS

(71) Applicant: The Trustees of Columbia University in the City of New York, New York, NY (US)

(72) Inventors: Lakshminarasimhan Sethumadhavan, New York, NY (US); Hiroshi Sasaki, New York, NY (US); Mohamed Tarek Bnziad Mohamed Hassan, New York, NY (US); Miguel A. Arroyo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/744,922

(22) Filed: Jan. 16, 2020

(65) Prior Publication Data

US 2020/0233591 A1     Jul. 23, 2020

Related U.S. Application Data

(60) Provisional application No. 62/794,317, filed on Jan. 18, 2019.

(51) Int. Cl.
| | |
|---|---|
| *G06F 3/06* | (2006.01) |
| *G06F 21/60* | (2013.01) |
| *G06F 21/62* | (2013.01) |

(52) U.S. Cl.
CPC .......... *G06F 3/0622* (2013.01); *G06F 3/0659* (2013.01); *G06F 3/0673* (2013.01); *G06F 21/604* (2013.01); *G06F 21/6218* (2013.01)

(58) Field of Classification Search
CPC .... G06F 21/604; G06F 3/0622; G06F 3/0659; G06F 21/6218; G06F 3/0673
(Continued)

(56) References Cited

U.S. PATENT DOCUMENTS

| | | |
|---|---|---|
| 6,330,556 B1 | 12/2001 | Chilimbi et al. |
| 6,542,967 B1 | 4/2003 | Major |

(Continued)

FOREIGN PATENT DOCUMENTS

WO     2018176339 A1     10/2018

OTHER PUBLICATIONS

D.Weston and M. Miller. Windows 10 mitigation improvements. Black Hat USA, 2016.
(Continued)

*Primary Examiner* — David Yi
*Assistant Examiner* — Zubair Ahmed
(74) *Attorney, Agent, or Firm* — Potomac Law Group, PLLC

(57) ABSTRACT

Disclosed are devices, methods, systems, media, and other implementations that include a method comprising accessing during execution of a process a memory element, determining whether data stored in the accessed memory element includes security data representative of locations that, if accessed, indicate a potential system violation condition, determining, in response to a determination that the accessed memory element includes the security data, whether execution of the process involves access of one or more memory locations in the accessed memory element containing the security data, and performing one or more remedial actions in response to a determination that the one or more memory locations in the memory element containing the security data are being accessed.

25 Claims, 16 Drawing Sheets

(58) Field of Classification Search
USPC .................................................. 711/163, 154
See application file for complete search history.

(56) References Cited

U.S. PATENT DOCUMENTS

| | | | |
|---|---|---|---|
| 7,761,676 B2 | 7/2010 | Doshi et al. | |
| 8,943,272 B2 | 1/2015 | Bell, Jr. et al. | |
| 9,176,887 B2 | 11/2015 | Habermann | |
| 9,454,533 B2 | 9/2016 | Cope et al. | |
| 9,852,074 B2 | 12/2017 | van Bemmel | |
| 2003/0208658 A1* | 11/2003 | Magoshi | G06F 12/0811 711/122 |
| 2005/0005265 A1* | 1/2005 | Knowles | G06F 9/45533 717/136 |
| 2013/0290607 A1 | 10/2013 | Chang et al. | |
| 2014/0189683 A1* | 7/2014 | Bing | G06F 9/45533 718/1 |
| 2014/0325656 A1* | 10/2014 | Sallam | G06F 21/52 726/24 |
| 2016/0170769 A1* | 6/2016 | LeMay | G06F 9/35 713/190 |
| 2018/0181499 A1* | 6/2018 | Branco | H04L 9/0618 |
| 2018/0285567 A1* | 10/2018 | Raman | G06F 21/566 |

OTHER PUBLICATIONS

Konstantin Serebryany, Derek Bruening, Alexander Potapenko, and Dmitry Vyukov. AddressSanitizer: a fast address sanity checker. In USENIX ATC '12: Proceedings of the 2012 USENIX Annual Technical Conference, pp. 28-28, Jun. 2012.
Hardware-assisted checking using Silicon Secured Memory (SSM). https://docs.oracle.com/cd/E37069_01/html/E37085/gphwb.html, 2015.
Oleksii Oleksenko, Dmitrii Kuvaiskii, Pramod Bhatotia, Pascal Felber, and Christof Fetzer. Intel MPX explained: a cross-layer analysis of the Intel MPX system stack. Proceedings of the ACM on Measurement and Analysis of Computing Systems, 2(2):28:1-28:30, 2018.
Dokyung Song, Julian Lettner, Prabhu Rajasekaran, Yeoul Na, Stijn Volckaert, Per Larsen, and Michael Franz. SoK: sanitizing for security. In IEEE S&P '19: Proceedings of the 40th IEEE Symposium on Security and Privacy, May 2019.
Gregory J Duck and Roland H C Yap. EffectiveSan: type and memory error detection using dynamically typed C/C++. In PLDI '18: Proceedings of the 39th ACM SIGPLAN Conference on Programming Language Design and Implementation, pp. 181-195, Jun. 2018.
Kostya Serebryany, Evgenii Stepanov, Aleksey Shlyapnikov, Vlad Tsyrklevich, and Dmitry Vyukov. Memory tagging and how it improves C/C++ memory safety. arXiv.org, Feb. 2018.
Joe Devietti, Colin Blundell, Milo M K Martin, and Steve Zdancewic. HardBound: architectural support for spatial safety of the C programming language. In ASPLOS XIII: Proceedings of the 13th International Conference on Architectural Support for Programming Languages and Operating Systems, pp. 103-114, Mar. 2008.
Jonathan Woodruff, Robert N M Watson, David Chisnall, Simon W Moore, Jonathan Anderson, Brooks Davis, Ben Laurie, Peter G Neumann, Robert Norton, and Michael Roe. The CHERI capability model: revisiting RISC in an age of risk. In ISCA '14: Proceedings of the 41st International Symposium on Computer Architecture, pp. 457-468, Jun. 2014.
Udit Dhawan, Catalin Hritcu, Raphael Rubin, Nikos Vasilakis, Silviu Chiricescu, JonathanMSmith, Thomas F Knight, Jr, Benjamin C Pierce, and Andre DeHon. Architectural support for software-defined metadata processing. In ASPLOS '15: Proceedings of the 20th International Conference on Architectural Support for Programming Languages and Operating Systems, pp. 487-502, Mar. 2015.
Paul Kocher, Daniel Genkin, Daniel Gruss, Werner Haas, Mike Hamburg, Moritz Lipp, Stefan Mangard, Thomas Prescher, Michael Schwarz, and Yuval Yarom. Spectre attacks: exploiting speculative execution. In IEEE S&P '19: Proceedings of the 40th IEEE Symposium on Security and Privacy, May 2019.
Alyssa Milburn, Herbert Bos, and Cristiano Giuffrida. Safelnit: comprehensive and practical mitigation of uninitialized read vulnerabilities. In NDSS '17: Proceedings of the 2017 Network and Distributed System Security Symposium, pp. 1-15, Feb. 2017.
Introduce struct layout randomization plugin. https://lkml.org/lkml/2017/5/26/558, May 2017.
Randomizing structure layout. https://lwn.net/Articles/722293/, May 2017.
Andrea Bittau, Adam Belay, Ali Mashtizadeh, David Mazi e res, and Dan Boneh. Hacking blind. In IEEE S&P '14: Proceedings of the 35th IEEE Symposium on Security and Privacy, pp. 227-242, May 2014.
Kangjie Lu, Chengyu Song, Taesoo Kim, and Wenke Lee. UniSan: proactive kernel memory initialization to eliminate data leakages. In CCS '16: Proceedings of the 23rd ACM SIGSAC Conference on Computer and Communications Security, pp. 920-932, Oct. 2016.
Fraco J, Hagelin M, Wrigstad T, Drossopoulou S, Eisenbach S, You can have it all: abstraction and good cache performance, Proceedings of the 2017 ACM SIGPLAN International Symposium on New Ideas, New Paradigms, and Reflections on Programming and Software <https://dl.acm.org/citation.cfm?doid=3133850.3133861>pp. 148-167 Oct. 2017.
Rubin S, Bernstein D, Rodeh M, Virtual Cache Line: A New Technique to Improve Cache Exploitation for Recursive Data Structures, Proceedings of the 8th International Conference on Compiler Construction <http://citeseerx.ist.psu.edu/viewdoc/summary?doi=10.1.1.75.415> pp. 259-273 1999.
Truong DN, Bodin F, Seznec A, Improving cache behavior of dynamically allocated data structures, Proceedings 1998 International Conference on Parallel Architectures and Compilation Techniques <https://ieeexplore.ieee.org/document/727268/> pp. 322-329 Oct. 1998.
Coole J, Stitt G, Traversal Caches: A Framework for FPGA Acceleration of Pointer Data Structures, International Journal of Reconfigurable Computing <https://www.hindawi.com/journals/ijrc/2010/652620/>vol. 2010 / Article 652620 Dec. 2010.
Segarra J, Rodriguez C, Gran R, Aparicio LC, Vinals V, A Small and Effective Data Cache for Real-Time Multitasking Systems, 2012 IEEE 18th Real Time and Embedded Technology and Applications Symposium <https://ieeexplore.ieee.org/document/6200077/>Apr. 2012.
Jonathan Woodruff, Alexandre Joannou, Hongyan Xia, Anthony Fox, Robert Norton, David Chisnall, Brooks Davis, Khilan Gudka, Nathaniel W Filardo, , A Theodore Markettos, Michael Roe, Peter G Neumann, Robert Nicholas MaxwellWatson, and Simon Moore. CHERI concentrate: practical compressed capabilities. IEEE Transactions on Computers, pp. 1-1, Apr. 2019. Another paper comes u p.
Arm A64 instruction set architecture for ARMv8-A architecturee profile. <https://static.docs.arm.com/ddi0596/a/DDI_0596_ARM_a64_> instruction_set_architecture.pdf, 2018.
Torres, Gabriel. "How The Cache Memory Works." Hardware Secrets, Feb. 16, 2016, www.hardwaresecrets.com/how-the-cache-memory-works/.
McMillan, Leonard. "Cache Structure". Comp 411 Computer Organization, Apr. 9, 2012, University of North Carolina.
Swanson, Steven. "Caching". CSE141 Introduction to Computer Architecture, May 23, 2013, University of California San Diego.
Ghosh, Sukumar. "Cache Memory". 22C:060 Computer Organization, Apr. 1, 2010, University of Iowa.
Daniel Sanchez and Christos Kozyrakis. ZSim: fast and accurate microarchitectural simulation of thousand-core systems. In ISCA '13: Proceedings of the 40th International Symposium on Computer Architecture, pp. 475-486, Jun. 2013.
Harish Patil, Robert Cohn, Mark Charney, Rajiv Kapoor, Andrew Sun, and Anand Karunanidhi. Pinpointing representative portions of large IntelR ItaniumR programs with dynamic instrumentation. MICRO-37: Proceedings of the 37th IEEE/ACM International Symposium on Microarchitecture, pp. 81-92, Dec. 2004.
Chi-Keung Luk, Robert Cohn, Robert Muth, Harish Patil, Artur Klauser, Geoff Lowney, Steven Wallace, Vijay Janapa Reddi, and Kim Hazelwood. Pin: building customized program analysis tools

(56) References Cited

OTHER PUBLICATIONS with dynamic instrumentation. In PLDI 05: Proceedings of the 26th ACM SIGPLAN Conference on Programming Language Design and Implementation, pp. 190-200, Jun. 2005.

Lizy Kurian John. More on finding a single number to indicate overall performance of a benchmark suite. ACM SIGARCH Computer Architecture News, 32(1):3-8, Mar. 2004.

Santosh Nagarakatte, Milo M K Martin, and Steve Zdancewic. Watchdog: hardware for safe and secure manual memory management and full memory safety. In ISCA '12: Proceedings of the 39th International Symposium on Computer Architecture, pp. 189-200, Jun. 2012.

Santosh Nagarakatte, Milo M K Martin, and Steve Zdancewic. WatchdogLite: hardware-accelerated compiler-based pointer checking. In CGO '14: Proceedings of the 12th IEEE/ACM International Symposium on Code Generation and Optimization, pp. 175-184, Feb. 2014.

Tong Zhang, Dongyoon Lee, and Changhee Jung. BOGO: buy spatial memory safety, get temporal memory safety (almost) free. In ASPLOS '19: Proceedings of the 24th International Conference on Architectural Support for Programming Languages and Operating Systems, pp. 631-644, Apr. 2019.

Feng Qin, Shan Lu, and Yuanyuan Zhou. SafeMem: exploiting ECCmemory for detecting memory leaks and memory corruption during production runs. In HPCA '05: Proceedings of the IEEE 11th International Symposium on High Performance Computer Architecture, pp. 291-302, Feb. 2005.

Kanad Sinha and Simha Sethumadhavan. Practical memory safety with REST. In ISCA '18: Proceedings of the 45th International Symposium on Computer Architecture, pp. 600-611, Jun. 2018.

Brooks Davis, Khilan Gudka, Alexandre Joannou, Ben Laune, A Theodore Markettos, J Edward Maste, Alfredo Mazzinghi, Edward Tomasz Napierala, Robert M Norton, Michael Roe, Peter Sewell, Robert N M Watson, Stacey Son, Jonathan Woodruff, Alexander Richardson, Peter G Neumann, Simon W Moore, John Baldwin, David Chisnall, James Clarke, and Nathaniel Wesley Filardo. Cheriabi: enforcing valid pointer provenance and minimizing pointer privilege in the POSIX C run-time environment.

Crispin Cowan, Calton Pu, Dave Maier, Heather Hintony, Jonathan Walpole, Peat Bakke, Steve Beattie, Aaron Grier, PerryWagle, and Qian Zhang. StackGuard: automatic adaptive detection and prevention of buffer-overflow attacks. In USENIX Security '98: Proceedings of the 7th USENIX Security Symposium, pp. 1-15, Jan. 1998.

\* cited by examiner (a) SPEC CPU2006 C and C++ benchmarks.

(b) V8 JavaScript engine.

Area, delay and power overheads of Califorms (GE represents gate equivalent). L1 Califorms (califorms-bitvector) adds negligible delay and power overheads to the L1 cache access.

| Design Name | Main synthesis results | | | L1 overheads | | | Fill overheads | | | Spill overheads | |
|---|---|---|---|---|---|---|---|---|---|---|---|
| | Area (GE) | Delay (ns) | Power (mW) | Area (%) | Delay (%) | Power (%) | Area (GE) | Delay (ns) | Power (mW) | Delay (ns) | Power (mW) |
| Baseline | 347,329.19 | 1.62 | 15.84 | — | — | — | — | — | — | — | — |
| L1 Califorms | 412,263.87 | 1.63 | 16.17 | 18.69 | 1.85 | 2.12 | 8,997.16 | 1.45 | 0.18 | 34,361.08 | 5.59 | 0.52 |

FIG. 11

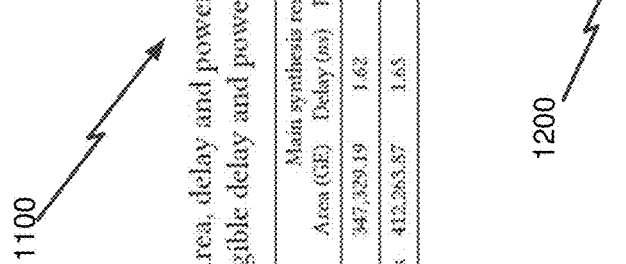

Hardware configuration of the simulated system.

| Core | x86-64 Intel Westmere-like OoO core at 2.27GHz |
|---|---|
| L1 inst. cache | 32KB, 4-way, 3-cycle latency |
| L1 data cache | 32KB, 8-way, 4-cycle latency |
| L2 cache | 256KB, 8-way, 7-cycle latency |
| L3 cache | 2MB, 16-way, 27-cycle latency |
| DRAM | 8GB, DDR3-1333 |

FIG. 12

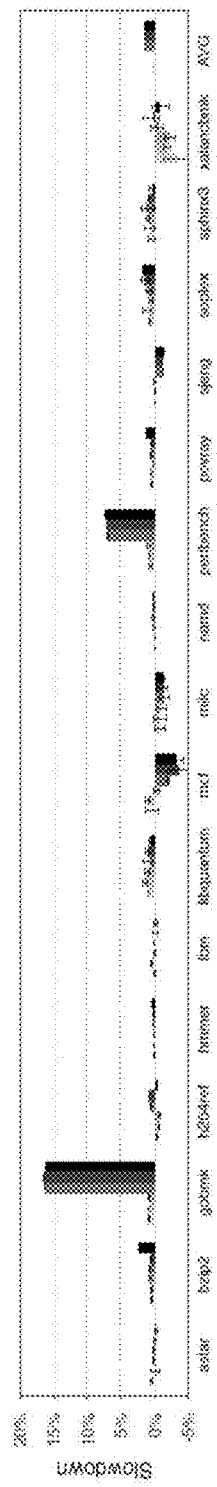
FIG. 14A
FIG. 14B

| Design Name | Main synthesis results | | | | L1 overheads | | | | Fill overheads | | | | Spill overheads | | |
|---|---|---|---|---|---|---|---|---|---|---|---|---|---|---|---|
| | Area (GE) | Delay (ns) | Power (mW) | Area (%) | Delay (%) | Power (%) | Area (GE) | Delay (ns) | Power (mW) | Area (GE) | Delay (ns) | Power (mW) | Area (GE) | Delay (ns) | Power (mW) |
| Baseline | 347,329.19 | 1.62 | 15.84 | -- | -- | -- | -- | -- | -- | -- | -- | -- | -- | -- | -- |
| Califorms-8B | 412,265.87 | 1.65 | 16.17 | 18.69 | 1.85 | 2.13 | 8,957.16 | 1.43 | 0.18 | 34,561.80 | 5.50 | 0.53 | | | |
| Califorms-4B | 370,972.35 | 2.42 | 17.95 | 6.80 | 49.38 | 11.00 | 9,770.04 | 1.92 | 0.31 | 35,775.36 | 5.99 | 0.68 | | | |
| Califorms-1B | 356,694.83 | 1.98 | 16.09 | 2.69 | 22.22 | 1.86 | 10,223.28 | 1.94 | 0.22 | 35,958.24 | 5.99 | 0.67 | | | |

METHODS AND SYSTEMS FOR FINE GRANULARITY MEMORY BLACKLISTING TO DETECT MEMORY ACCESS VIOLATIONS

CROSS-REFERENCE TO RELATED APPLICATIONS

This application claims the benefit of U.S. Provisional Application No. 62/794,317, entitled "CALIFORMS—CACHE LINE FORMATTING" and filed Jan. 18, 2019, the content of which is incorporated herein by reference in its entirety.

STATEMENT REGARDING FEDERALLY SPONSORED RESEARCH

This invention was made with government support under contract number HR0011-18-C-0017 awarded by the Defense Advanced Research Projects Agency (DARPA). The government has certain rights in the invention.

BACKGROUND

Current software and hardware-supported solutions generally provide coarse-grained memory safety, i.e., detecting memory access beyond arrays and malloc'd regions (struct and class instances). However, they are not usable for fine-grained memory safety (i.e., detecting overflows within objects, such as fields within a struct, or members within a class) due to the high-performance overheads and/or need for making intrusive changes to the source code. For instance, a recent work that aims to provide intra-object overflow functionality incurs a 2.2× performance overhead. These overheads are problematic because they not only reduce the number of pre-deployment tests that can be performed (for a given budget), but also impede post-deployment continuous monitoring, which researchers have pointed out is necessary for detecting benign and malicious memory safety violations.

SUMMARY

Disclosed herein are approaches and implementations for a microarchitectural approach (which can also be utilized with cache-based and non-cache-based memory elements, to implement cache line formatting, or "Califorms") and associated program observations to obtain a low overhead security solution for practical intra-object memory safety. The idea builds on memory blacklisting, which prohibits a program from accessing certain memory regions based on program semantics. However, traditional blacklisting techniques are not generally well suited for intra-object memory safety because of implementation overheads. The Califorms-based system implementation described herein reduces the memory overheads of metadata for blacklisting from ≈100% to 0.2%, and consequently reduces the performance overhead of accessing metadata from ≈1.7×-2.2×, to ≈1.02×-1.16×. The key observations that provide these performance improvements are that (a) metadata can be stored in dead spaces in a program's data memory and (b) this metadata can be integrated into microarchitecture by changing the memory line (e.g., cache line) format.

The memory blacklisting approaches described herein use, in some embodiments, a hardware primitive which allows blacklisting a memory location at byte granularity with low area and performance overhead. A key observation behind the blacklisting implementation described herein is that a blacklisted region need not store useful data separately in most cases, since byte-granular space, existing or added, between object elements to store the metadata can be utilized. This in-place compact data structure also avoids additional operations for extraneously fetching the metadata making it very performant in comparison. Further, by changing how data is stored within a memory line, the hardware area overheads can be reduced substantially. Subsequently, if the processor accesses a califormed byte (or a security byte), due to programming errors or malicious attempts, it reports a privileged exception.

To provide memory safety, the memory blacklisting implementations described herein insert security bytes within data structures (e.g., between fields of a struct) upon memory allocation and clear them on deallocation. Notably, by doing so, fine-granular blacklisting can even detect intra-object overflows, which is one of the prominent open problems in memory safety. The embodiments described herein thus provide a solution (that can be implemented through hardware and/or software primitives) to achieve byte-granular blacklisting.

In some embodiments, a cache is used by the CPU of a computer to reduce the average cost (time or energy) to access data from the main memory. Caches (and other memory devices) may be partitioned into 'lines' that contain 'tags' indicating the address in main memory from which the data has been copied. When reading data from a cache, the tag bits in the requested address are compared against cache line tags; a cache hit is when the tags match and a cache miss is when they do not. Tag comparison is slow, and tag storage overhead is high. Additionally, cache hit rate and latency are often maintained by adding an additional cache for metadata processing, further increasing storage and performance overhead.

The technology described herein can provide an in-place, compact cache line data structure and associated processes and algorithms for fast metadata processing and object and sub-object bounds checking. Some example embodiments minimize metadata storage and computing costs and offer a 64× reduction in overhead (1 bit per 64 bytes cache line) by storing pointers within the cache line that allow accessing metadata inline rather than in a separate memory device. The technology described herein is easy to integrate with existing memory security architectures and has the potential to reduce system performance latency and storage overhead costs, ultimately improving system efficiency.

Thus, in some variations, a method is provided that includes accessing during execution of a process a memory element, determining whether data stored in the accessed memory element includes security data representative of locations that, if accessed, indicate a potential system violation condition, determining, in response to a determination that the accessed memory element includes the security data, whether execution of the process involves access of one or more memory locations in the accessed memory element containing the security data, and performing one or more remedial actions in response to a determination that the one or more memory locations in the memory element containing the security data are being accessed.

Embodiments of the method may include at least some of the features described in the present disclosure, including one or more of the following features.

Determining whether the data stored in the accessed memory element includes the security data may include determining if a flag associated with the accessed memory element is set.

The flag may include one or more of, for example, a cache overhead bit associated with a cache line in cache memory when the memory element is a cache-line memory element, an error correction code (ECC) bit located in an ECC section of a first DRAM memory device or cache memory implementing ECC functionality when the memory element is a memory element of the first DRAM device or a cache memory, and/or a reserved bit in a second DRAM memory device without an ECC section when the memory element is a memory element of the second DRAM memory device.

Determining whether execution of the process involves access of one or more memory locations in the accessed memory element containing the security data may include determining, in response to a determination that the flag associated with the accessed memory element is set, locations of the one or more memory locations containing the security data based on a location indicator structure associated with the memory element, indicating the locations of the one or more memory locations.

The location indicator structure may include a memory structure with a length in bits corresponding to a number of bytes of the memory element, with each of the bits of the memory structure being configured to be set to indicate that a respective byte of the memory element associated with that each of the bits contains at least a portion of the security data.

The method may further include retrieving from another memory device initial data content to store in the memory element, and determining if the retrieved initial data content includes the security data. Additionally, the method may also include, in response a determination that the retrieved data content includes the security data, reformatting the retrieved initial data content to a resultant reformatted data content comprising re-arranged actual data, re-arranged and re-formatted security data, and location data identifying locations of the security data in the retrieved initial data content. The method may additionally include setting a bit associated with the memory element to a value indicating the memory element storing the resultant reformatted data includes the security data.

Reformatting the retrieved initial data content may include identifying one or more locations within the retrieved initial data content comprising the security data, determining, based on values of portions comprising the actual data within the retrieved initial data, a unique sentinel value, different from any of the values of the portions comprising the actual data, to represent the reformatted security data, and storing at a header portion of the memory element the unique sentinel value and location information identifying the locations of the security data within the retrieved initial data content.

The memory element may include an L2 level or higher-level memory element, and retrieving from the other memory device the initial data content may include retrieving from an L1 level cache memory the initial data content upon eviction of an L1 cache line containing the initial data content.

Performing one or more remedial actions may include one or more of, for example, raising an exception, disabling the process, and/or notifying a user of the potential system violation condition.

Determining whether the data stored in the accessed memory element includes security data may include determining by a hardware-based detection circuit coupled to L1-level cache memory elements whether a bit associated with the accessed memory element is set.

Performing the one or more remedial actions in response to the determination that the one or more memory locations in the accessed memory element containing the security data are being accessed may include triggering another process with a higher or same privilege level as a particular privilege level associated with the process, to handle occurrence of the potential system violation condition.

Triggering the other process may include communicating to the other process information about access of the memory element, including one or more of, for example, a program counter value, timing information for the access of the memory element, and/or other information.

The security data may be stored in one or more memory locations within memory regions allocated for storing data structures.

The method may further include controlling the security data stored in the memory element through execution of an instruction set architecture instruction 'BLOC R1, R2, R3', configured to blacklist memory locations at byte granularity and raise a privileged exception upon misuse of blacklisted locations, with R1 representing identity of a first register storing a pointer value pointing to a starting address of the memory element in a virtual address space, R2 representing identity of a second register storing a flag value indicating whether the memory element includes the security data, and R3 representing identity of a third register storing a mask identifying the one or more location in the memory element comprising the security data.

In some variations, a computing system is provided that includes at least one memory device comprising one or more memory elements, and a controller. The controller is configured to access during execution of a process a memory element from the one or more memory elements, determine whether data stored in the accessed memory element includes security data representative of locations that, if accessed, indicate a potential system violation condition, determine, in response to a determination that the accessed memory element includes the security data, whether execution of the process involves access of one or more memory locations in the accessed memory element containing the security data, and perform one or more remedial actions in response to a determination that the one or more memory locations in the memory element containing the security data are being accessed.

In some variations, a non-transitory computer readable media is provided, that includes instructions executable on a processor-based device to access during execution of a process a memory element, determine whether data stored in the accessed memory element includes security data representative of locations that, if accessed, indicate a potential system violation condition, determine, in response to a determination that the accessed memory element includes the security data, whether execution of the process involves access of one or more memory locations in the accessed memory element containing the security data, and perform one or more remedial actions in response to a determination that the one or more memory locations in the memory element containing the security data are being accessed.

Embodiments of the system and the computer readable media is may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

FIG. 11 is a table summarizing performance results for the L1 Califorms (using califorms-bitvector) solution.

FIG. 12 is a table providing hardware configuration parameters for a processor used to run simulations in the course of evaluating the performances of the approaches described herein.

FIGS. 14A-B include graphs showing slowdowns incurred by different types of blacklisting strategies.

Like reference symbols in the various drawings indicate like elements.

DESCRIPTION

Figure 1:
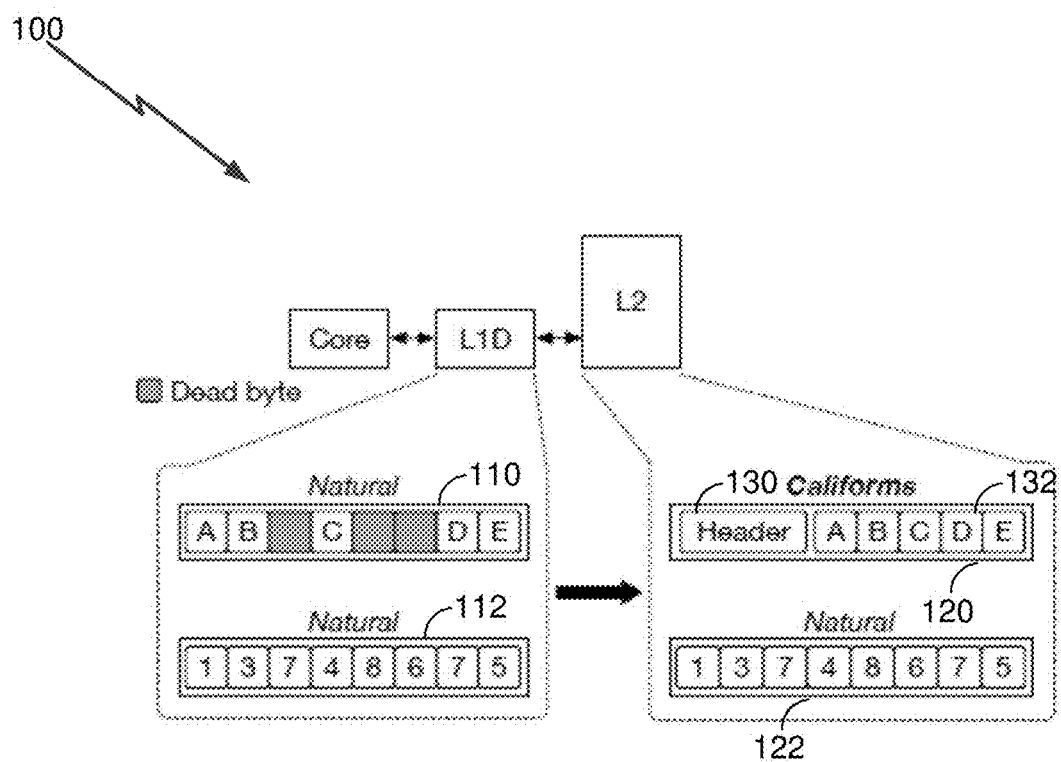
FIG. 1 is a diagram illustrating formatting used for contents (with and without security/blacklisting data) at different storage levels.

Described herein are systems, methods, devices, circuits, and other implementations to realize fine-granularity memory blacklisting to facilitate the detection of potential security breaches when a program or process attempts to access a memory element containing a mark or tag indicating that that memory elements is not supposed to be accesses. In some embodiments, the implementations described herein are used to manage/control access of short memory configurations or arrangement, including cache-line memory element structures. In such embodiments, a hardware primitive can be used to allow blacklisting a memory location at byte granularity with low area and performance overhead. A key observation behind cache-line memory control (referred to as Cache-line formatting, or "Califorms"; coliforms can be applied to non-cache based memory elements) is that a blacklisted region need not store useful data separately in most cases, since byte-granular, existing or added, can utilize space present between object elements to store metadata needed to implement some embodiments of the approaches described herein. This in-place compact data structure also avoids additional operations for extraneously fetching the metadata, making it very performant in comparison. Furthermore, by changing how data is stored within a data line, the hardware area overheads can be reduced substantially. Subsequently, when a processor attempts to access a califormed byte (a security byte), as a result of programming errors or malicious attempts, a privileged exception may be reported. Although some of the embodiments described herein discuss implementations for blacklisting and controlling access for cache-based memory elements, the approaches described herein may be implemented for other types of memory device, including volatile memory (e.g., DRAM storage), and non-volatile memory devices (e.g., solid-state non-volatile storage, magnetic storage, or other type of non-volatile/persistent media).

In some embodiments, to provide memory safety, the Califorms approaches described herein are used to insert security bytes within data structures (e.g., between fields of a struct) upon memory allocation and clear them on deallocation. Notably, by doing so, Califorms can even detect intra-object overflows. Required compiler and software support for providing memory safety using Califorms is also discussed in greater detail below.

Thus, in some embodiments, a method is provided that includes accessing during execution of a process a memory element (e.g., cache-based element, or other types of storage devices or circuitry), determining whether data stored in the accessed memory element includes security data representative of locations that, if accessed, indicate a potential system violation condition, determining, in response to a determination that the accessed memory element includes the security data, whether execution of the process involves access of one or more memory locations in the accessed memory element containing the security data, and performing one or more remedial actions in response to a determination that the one or more memory locations in the memory element containing the security data are being accessed. In some embodiments, a computing system is provided that includes at least one memory device comprising one or more memory elements, and a controller configured to access during execution of a process a memory element from the one or more memory elements, determine whether data stored in the accessed memory element includes security data representative of locations that, if accessed, indicate a potential system violation condition, determine, in response to a determination that the accessed memory element includes the security data, whether execution of the process involves access of one or more memory locations in the accessed memory element containing the security data, and perform one or more remedial actions in response to a determination that the one or more memory locations in the memory element containing the security data are being accessed.

Part of the memory access detection solution used for detecting impermissible access to certain areas of memory segments (for the purpose of illustration, the present description focuses on 64 byte long memory segments, which match the length, in bytes, of some cache line elements) is predicated on blacklisting memory locations that should not be accessed (e.g., by using some pre-determined values to populate those locations), instead of having to regularly check access bounds for each pointer access (which would increase complexity, latency, and overhead). Blacklisting can be more practical than whitelisting solutions (e.g., to delineate areas of memory that are allowed to be accessed) because of its ease of deployment and low overheads. Informally, deployments apply whitelisting techniques partially to reduce overheads and be backward compatible, which reduces their security, while blacklisting techniques can be applied more broadly due to their low overheads. Additionally, blacklisting techniques complement defenses in existing systems better since they do not require intrusive changes. A second part of the memory access detection solution is based on a novel metadata storage scheme. Note that by using dead memory spaces in a program, metadata needed for memory safety can be stored for free for nearly half of the program objects. These dead spaces occur because of language alignment requirements and are inserted by the compiler. When a naturally occurring dead space cannot be found, a dead space is inserted (as will be described in greater detail below). The overhead due to this dead space is smaller than traditional methods for storing metadata because of how the metadata is represented: in some of the approaches described herein, the metadata is smaller (one byte) as opposed to multiple bytes with traditional whitelisting or other blacklisting memory safety techniques.

A natural question is how the dead (more commonly referred to as padding) bytes can be distinguished from normal bytes in memory. A straightforward scheme results in one bit of additional storage per byte to identify if a byte is a dead byte; this scheme results in a space overhead of 12.5%. This overhead can be reduced to one bit per 64 B cache line (0.2% overhead) without any loss of precision by only reformatting how data is stored in memory elements (such as cache lines, or other memory structures that may be configured to emulate cache lines, e.g., arranging 64 or 128 bytes of sequential memory, that can then be retrieved and loaded into cache lines of a cache memory). The techniques described herein (e.g., the Califorms techniques) may use one bit of additional storage to identify if the cache line associated with the memory contains any dead bytes. For califormed cache lines, i.e., re-configured/re-formatted lines of data corresponding to memory segments that contain dead bytes, the actual data may be re-arranged (relative to the initial arrangement of the content of a retrieved memory segment) so that it is stored following a "header," which includes the information identifying the location of dead bytes in the initial retrieved memory segment.

With reference to FIG. 1, a diagram 100 illustrating storage of initial (natural) content segments at two difference cache memory levels is provided. As shown, two data line segments 110 and 112 are stored in their "natural" format at the L1 cache level (the line segments need to be provided in their un-formatted/decoded configurations so that the content of those line segments is available for processing by the core at minimal latency). As will be discussed in greater detail below, with content in cache lines of the L1 cache level provided in its "natural," decoded form, the cache architecture requires enough overhead to be able to identify (with relatively minimal latency) whether a particular cache line has blacklisted locations, and if so, the locations, of the blacklisted memory location for each such cache line content. However, when a particular line content is stored in higher memory levels (e.g., L2 cache level and beyond), overhead required to identify blacklisted locations (with relatively low latency) can be significantly reduced by reformatting the content of the line (e.g., when it spills from the L1 cache level, or when the content is retrieved from non-cache memory device) into a format where the blacklisted locations (within the line), and the blacklisted values are represented by a header, and the actual content of the line is re-arranged into sequential (possibly contiguous) locations. Thus, the line 110 (as it appears in its decoded (or "natural") format in the L1 cache level, is converted into a re-formatted (encoded) line 120 in which the header 130 includes data identifying the locations of the blacklisted memory areas of the line 120, and the actual content 132 has been re-arranged into a sequential arrangement of data. The line 112, on the other hand, does not include blacklisted area (as may have been indicated by a flag, such as a 1-bit flag, associated with the line), and thus, when the line 112 is spilled into the L2 cache level (or the original data fetched from higher memory areas), no re-formatting is performed (because there are no blacklisted locations within the line 112 or 122).

With this support, it is relatively straightforward to describe how a blacklisting (Califorms) based system for memory safety works. The dead bytes, either naturally harvested or manually inserted, are used to indicate memory regions that should never be accessed by a program (i.e., blacklisting). If an attacker accesses these regions, this rogue access is detected without any additional metadata accesses as our metadata resides inline. Experimental results on the SPEC CPU2006 benchmark suite indicate that the overheads of Califorms are quite low: software overheads range from 2 to 14% slowdown (or alternatively, 1.02× to 1.16× performance overhead) depending on the amount and location of padding bytes used. This provides the functionality for the user/customer to tune the security according to their performance requirements. Hardware induced overheads are also negligible, on average less than 1%. In the experimentations performed to test the implementations and approaches discussed herein, all of the software transformations were performed using the LLVM compiler framework using a front-end source-to-source transformation. These overheads are substantially lower compared to the state-of-the-art software or hardware supported schemes (viz., 2.2× performance and 1.1× memory overheads for EffectiveSan, and 1.7× performance and 2.1× memory overheads for Intel MPX).

Figure 2:
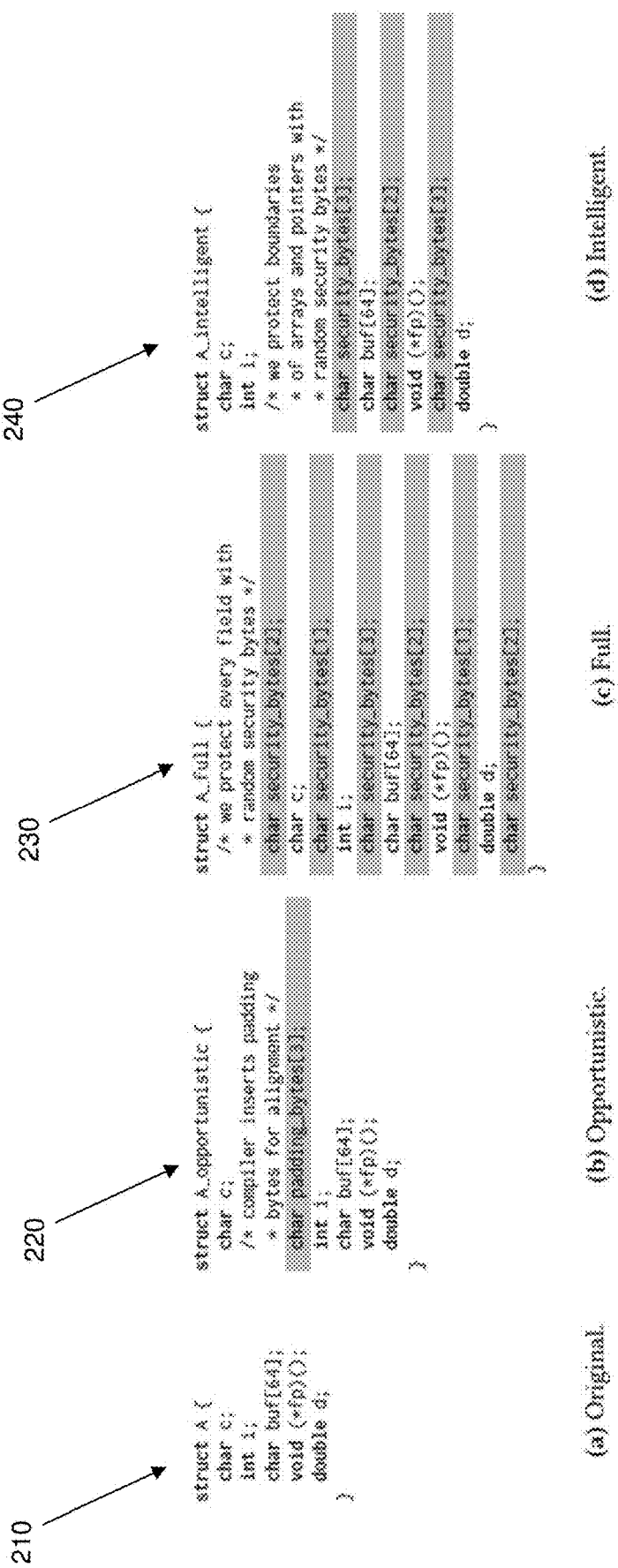
FIG. 2 includes examples of three security byte harvesting strategies performed on a particular original listing.
Figure 3A:
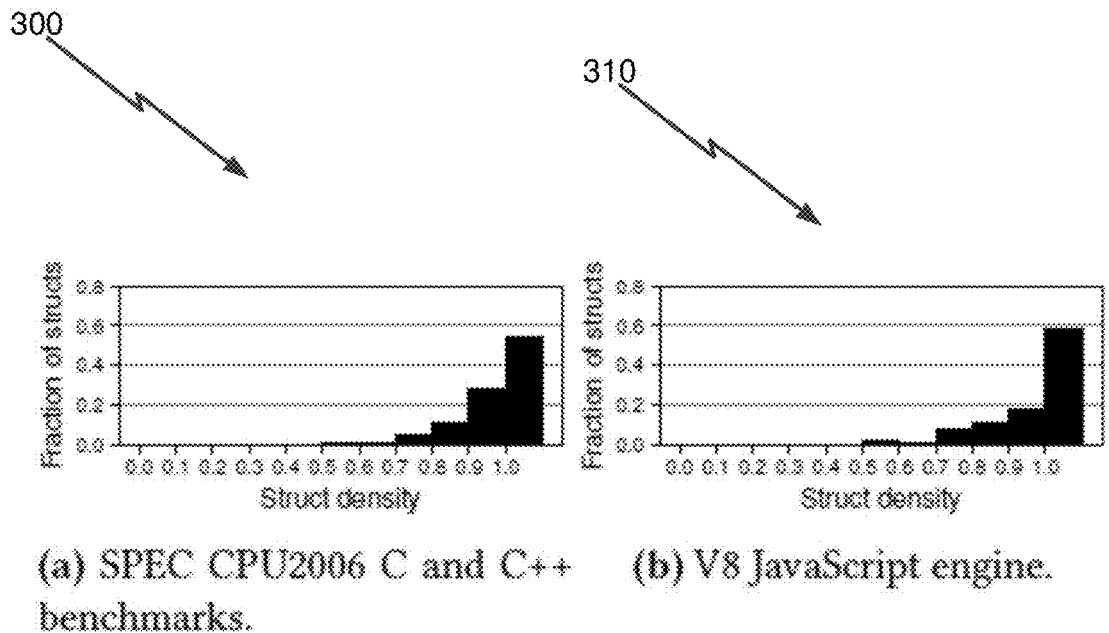
FIG. 3A includes padding densities histograms for data structures in two different implementations.

One of the key ways in which the overheads for finegrained memory safety can be mitigated is by opportunistically harvesting padding bytes in programs to store metadata. It is worthwhile exploring how often padding bytes (that can be harvested) occur in programs. To address this issue, consider a struct A defined in a listing (a) (marked as listing 210 in FIG. 2, which includes examples of three security byte harvesting strategies performed on the original listing 210). Suppose the compiler inserts a three-byte padding in between char c and int i as in Listing (b) (marked with reference numeral 220) because of a C language requirement that integers should be padded to their natural size (which is assumed to be four bytes here). These types of paddings are not limited to C/C++ but also many other languages, and their runtime implementations. To obtain a quantitative estimate on the amount of paddings, a compiler pass was developed to statically collect the padding size information. FIG. 3A includes graphs 300 and 310 presenting the histograms of struct densities for SPEC CPU2006 C and C++ benchmarks and the V8 JavaScript engine. Struct density is defined as the sum of the size of each field divided by the total size of the struct including the padding bytes (i.e., the smaller or sparse the struct density, the more padding bytes the struct has). The results reveal that 45.7% and 41.0% of structs within SPEC and V8, respectively, have at least one byte of padding. This is encouraging since even without introducing additional padding bytes (no memory overhead), protection can be offered for certain compound data types restricting the remaining attack surface.

To offer protection for all defined compound data types (called the full strategy), random sized padding bytes (also referred to as security bytes) can be inserted between every field of a struct or member of a class (as illustrated in listing (c), marked with reference numeral 230). Random sized security bytes may be chosen to provide a probabilistic defense as fixed sized security bytes can be jumped over by an attacker once s/he identifies the actual size (and the exact memory layout). Additionally, by carefully choosing the minimum and maximum sizes for insertion, the average security byte size can be kept small (e.g., two or three bytes). Intuitively, the higher the unpredictability (or randomness) there is within the memory layout, the higher the security level that can be offered. While the "full" strategy provides the widest coverage, not all of the security bytes provide the same security utility. For example, basic data types such as char and int cannot be easily overflown past their bounds. The idea behind intelligent insertion strategy is to prioritize insertion of security bytes into security-critical locations, as presented in Listing (d) (marked with reference numeral 240 in FIG. 2). Data types which are most prone to abuse by an attacker via overflow type accesses include: (1) arrays, and (2) data and function pointers. In the example in Listing (d) 240, the array buf[64] and the function pointer fp are protected with random sized security bytes. While it is possible to utilize padding bytes present between other data types without incurring memory overheads, doing so would come at an additional performance overhead.

Figure 3B:
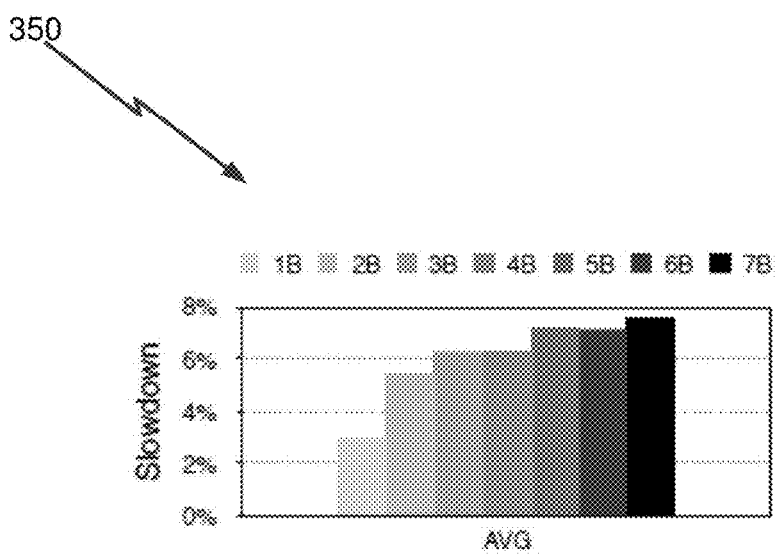
FIG. 3B is a graph showing average performance overhead with addition padding inserted for every field within a data structure.

In comparison to opportunistic harvesting, the other more secure strategies (e.g., full strategy) come at an additional performance overhead. The performance trends are analyzed in order to decide how many security bytes can be reasonably inserted. For this purpose, an LLVM pass was developed which padded every field of a struct with fixed size paddings. The performance of SPEC CPU2006 benchmarks was measured by varying the padding size from one byte to seven bytes. Graph 350 of FIG. 3B demonstrates the average slowdown when inserting additional bytes for harvesting. As expected, the performance overhead is seen to increase as the padding size increases, mainly due to ineffective cache usage. On average the slowdown is 3.0% for one byte and 7.6% for seven bytes of padding. The figure presents the ideal (lower bound) performance overhead when fully inserting security bytes into compound data types; the hardware and software modifications introduced add additional overheads on top of these numbers. The goal, therefore, is to provide a mechanism that allows the user to tune the security level at the cost of performance and thus explore several security byte insertion strategies to reduce the performance overhead.

Next, a description of a full system implementation of the blacklisting approaches (including the "Califorms") is provided. The Califorms framework includes multiple aspects:
Architecture Support—An ISA extension of a machine instruction called CFORM (also referred to as the 'BLOC' instruction) that performs califorming (i.e., (un)setting security bytes) of cache lines, and a privileged Califorms exception which is raised upon misuse of security bytes.
Microarchitecture Design—New cache line formats that allows low cost access to the metadata. Different Califorms implementations for L1 cache vs. L2 cache (and beyond) are described and analyzed.
Software Design—Compiler, memory allocator and operating system extensions which insert the security bytes at compile time and manages the security bytes via the CFORM/BLOC instruction at runtime are also described and analyzed.

More particularly, and starting first with the architectural support aspect, at compile time each compound data type, a struct or a class, is examined and security bytes are added according to a user defined insertion policy viz. opportunistic, full or intelligent, by a source-to-source translation pass. When the binary is run with security bytes, or when compound data type instances are created in the heap dynamically, a new version of malloc is used that issues CFORM instructions to set the security bytes after the space is allocated. In some embodiments, when the CFORM instruction is executed, the cache line format is transformed at the L1 cache controller (assuming a cache miss) and is inserted into the L1 data cache. Upon an L1 eviction, the L1 cache controller re-califorms the cache line to meet the califorms requirements of the L2 cache (i.e., if the L2 level requires different formatting from that implemented for the L1). In some implementations realized herein, while additional metadata storage is added to the caches, such additional overhead may be avoided for main memory and persistent storage in order to keep the changes local within the CPU core. In some embodiments, when a califormed cache line is evicted from the last-level cache to main memory, the cache line may be kept califormed, and an additional one metadata bit added into spare error-correction-code (ECC) bits (similar to Oracle's ADI). When a page is swapped out from main memory, the page fault handler stores the metadata for all the cache lines within the page into a reserved address space managed by the operating system; the metadata is reclaimed upon swap in. Therefore, some of the implementations described herein keep the cache line format califormed throughout the memory hierarchy. A califormed cache line may be un-califormed when the corresponding bytes cross the boundary where the califormed data cannot be understood by the other end, such as writing to I/O (e.g., pipe, filesystem or network socket). Finally, when an object is freed, the freed bytes are califormed and zeroed for offering temporal safety.

At runtime, when a rogue load or store accesses a califormed byte the hardware may cause the return of a privileged, precise security exception to the next privilege level which can take any appropriate action, including terminating the program.

Thus, an noted, the implementations described herein require architectural support in the form of the inclusion of an instruction (included in the instruction set architecture, or ISA) to control security data added to actual data (e.g., in the form of padding). An example of such an instruction is "CFORM R1, R2, R3." The value in register R1 points to the starting (cache aligned) address in the virtual address space, denoting the start of the 64 B chunk which fits in a single 64 B cache line. The value in register R2 indicates the attributes of said region represented in a bit vector format (1 to set and 0 to unset the security byte). The value in register R3 is a mask to the corresponding 64 B region, where 1 allows and 0 disallows changing the state of the corresponding byte. The mask is used to perform partial updates of metadata within a cache line. A privileged califorms exception is triggered when the CFORM instruction tries to set a security byte to an existing security byte location, and unset a security byte from a normal byte. Alternatively, the CFORM instruction may be replaced with a similar BLOC instruction (based on the (mnemonic for Blacklist LOCations), which operates similarly to the CFORM instruction, and is configured to blacklist memory locations at byte granularity and raise a privileged exception upon misuse of blacklisted locations. Thus, in some embodiments, system or device implementations of the caliform approaches described herein may be based on controlling the security data stored in a memory element through execution of an ISA instruction 'BLOC R1, R2, R3', configured to blacklist memory locations at byte granularity and raise a privileged exception upon misuse of blacklisted locations, with R1 representing identity of a first register storing a pointer value pointing to a starting address of the memory element in a virtual address space, R2 representing identity of a second register storing a flag value indicating whether the memory element includes the security data, and R3 representing identity of a third register storing a mask identifying the one or more location in the memory element comprising the security data. For convenience, for remainder of the discussion, reference will be made to the CFORM instruction, but the description is interchangeably applicable to the BLOC instruction.

The BLOC/CFORM instruction may be treated similarly to a store instruction in the processor pipeline, where it first fetches the corresponding cache line into the L1 data cache upon an L1 miss (assuming a write allocate cache policy), and then manipulates the bits in the metadata storage to appropriately set or unset the security bytes.

When the hardware detects an access violation, it throws a privileged exception once the instruction becomes non-speculative. There are some library functions which violate the aforementioned operations security bytes such as memcpy, so a way to suppress the exceptions is needed. In order to whitelist such functions, the exception mask registers can be manipulated to let the exception handler decide whether to suppress the exception or not. Although privileged exception handling is more expensive than handling user-level exceptions (because it requires a context switch to the kernel), it may be useful to stick with the former to limit the attack surface. The implementations described herein rely on the fact that the exception itself is a rare event and would have negligible effect on performance.

Next, as noted, embodiments of the blacklisting approaches described herein (to detect potential rogue activity and system access violations) can be realized through implementations that seek to determine, with minimal latency and overhead, whether data segments include blacklisted memory location, and if so, to determine if executing instructions of a current process (executed by the core processor(s)) are attempting access into specific memory locations (of the data segment determine to include blacklisted memory location) that are blacklisted (e.g., contain security data indicating that the memory location is not one that is supposed to be accessed). Thus, in some implementations, a system is provided that includes at least one memory device (e.g., which may include cache-memory, persistent memory, DRAM, etc.) comprising one or more memory elements, and a controller (implemented as a dedicated circuit, based on a programmable processor, some combination thereof, etc.) configured to access during execution of a process a memory element from the one or more memory elements, determine whether data stored in the accessed memory element includes security data representative of locations that, if accessed, indicate a potential system violation condition, determine, in response to a determination that the accessed memory element includes the security data, whether execution of the process involves access of one or more memory locations in the accessed cache-based element containing the security data, and perform one or more remedial actions in response to a determination that the one or more memory locations in the memory element containing the security data are being accessed.

In some embodiments, the microarchitectural support for the techniques and approaches described herein aims to keep the common case fast, in which L1 cache uses a straight-forward scheme to detect if a data line has blacklisted areas, and if so whether those area are being accessed by an executing instruction of a running process, by having one bit of additional storage per byte. All blacklisted (califormed) cache lines are transformed to the straightforward scheme at the L1 data cache controller so that typical loads and stores which hit in the L1 cache do not have to perform address calculations to figure out the location of original data (which is required for Califorms of L2 cache and beyond). This implementation decision guarantees that for the common case the latencies will not be affected due to security functionality. Beyond the L1, the data may be stored in the optimized califormed format, i.e., one bit of additional storage for the entire cache line. The transformation happens when the data is filled in or spilled from the L1 data cache (between the L1 and L2), and adds minimal latency to the L1 miss latency. For main memory, the additional bit per cache line size may be stored in the DRAM Error-Correction-Code (ECC) spare bits, thus completely removing any cycle time impact on DRAM access or modifications to the DIMM architecture. For systems that do not have ECC DRAM, the page/memory allocator can reserve a certain number of bytes to store the information about "flag" bits. Ideally, this data should be stored alongside the data (say, in the same DRAM page to minimize access latency). For instance, if the DRAM row buffer is 2 KB, 4 bytes could be reserved for each 2 KB, so that no additional ROW accesses are required to fetch the metadata. By weaving the security data alongside the actual data, the cost of fetching the califormed byte can be amortized to one additional CAS access with little to no performance overhead. Further, the memory controller can be configured to prevent access by the program to the "flag" data.

Figure 4:
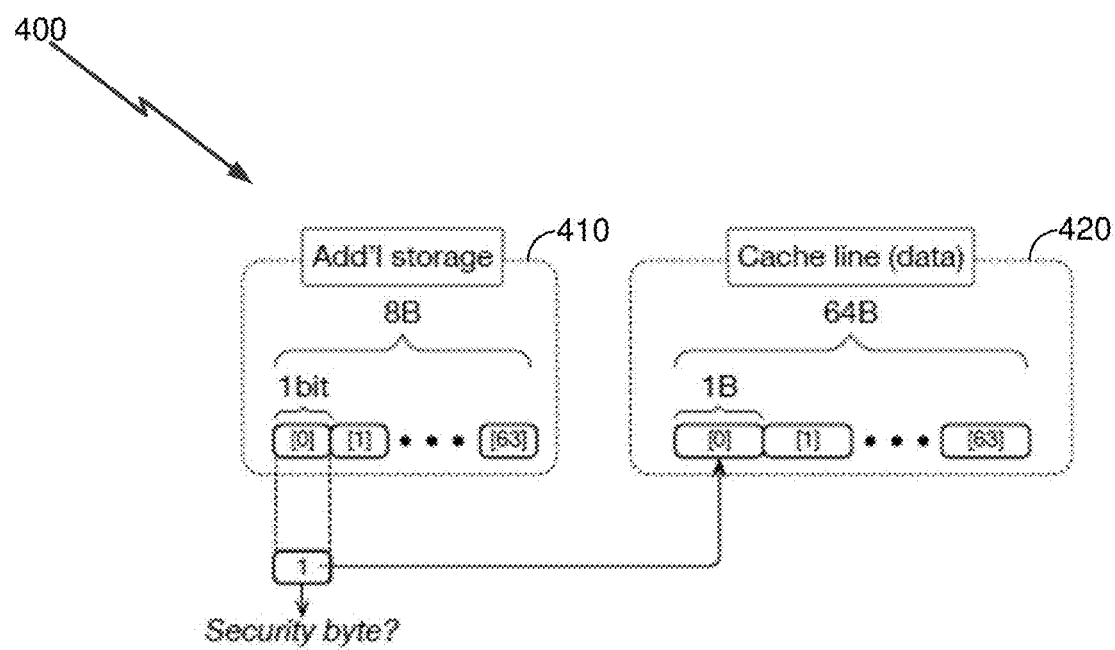
FIG. 4 is a schematic view of an example califorms-bitvector implementation.

With more particularity regarding the L1 califormed implementations that may be realized in some embodiments, the L1 cache blacklisting scheme may be realized according to a bit-vector approach. To satisfy the L1 design requirements, a low latency approach which uses a bit vector to identify which bytes are security bytes (i.e., blacklisted bytes) in a cache line. Each bit of the bit vector corresponds to each byte of the cache line and represent its state (normal byte or security byte). FIG. 4 provides a schematic view of an example califorms-bitvector implementation 400. The implementation 400 includes a bit vector 410 with a 64-bit (8 B) bit vector per 64 B cache line 420, which adds 12.5% storage overhead for just the L1-D caches (this is comparable to ECC overhead for reliability). When a bit of a bit vector is set, this indicates that the associate bytes of the cache line holding actual data is occupied with security (blacklisted) data, and thus attempts to access any byte marked/indicated by the bitvector as security data is indicative of a potential system violation. Cache lines with longer or shorter storage would require bitvectors of correspondingly longer or shorter sizes.

Figure 5:
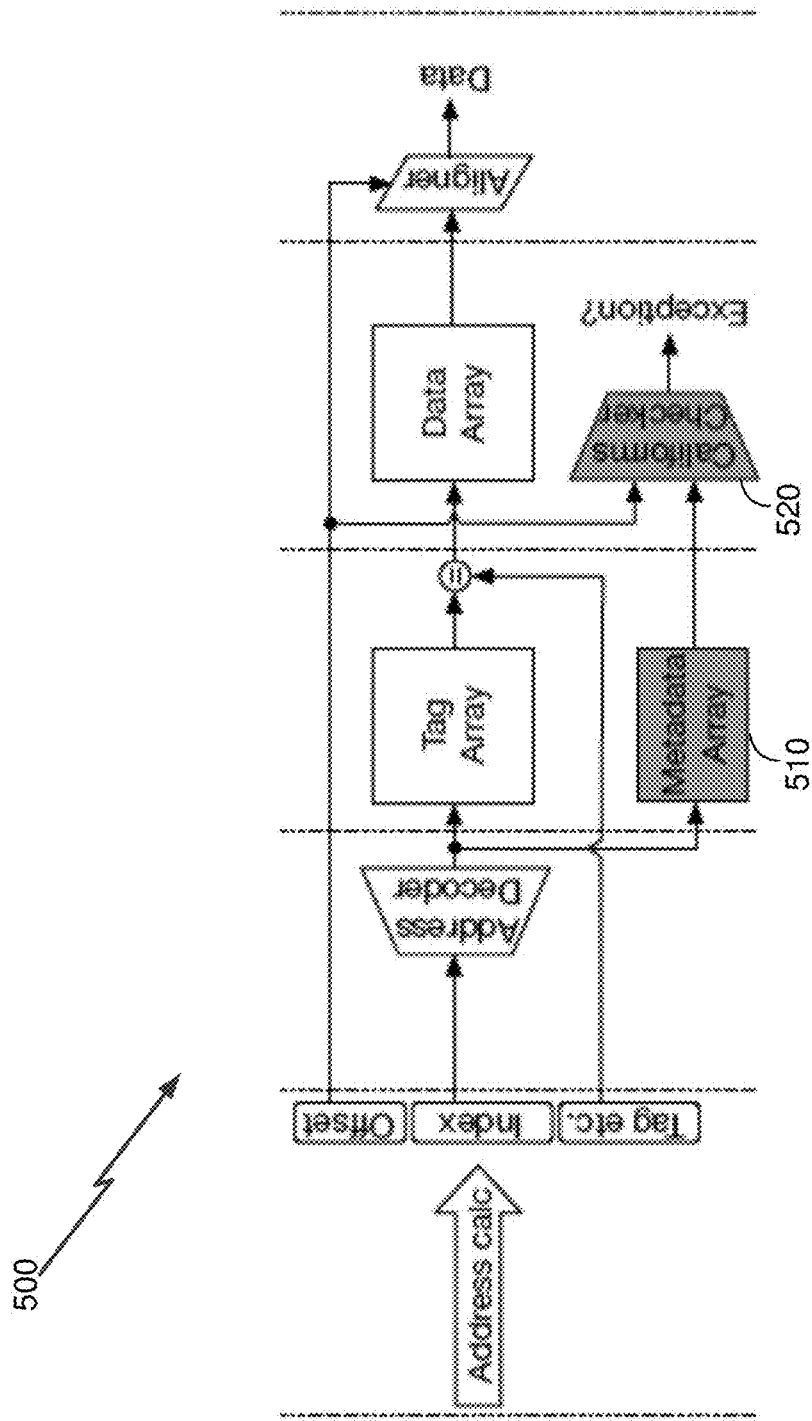
FIG. 5 is a schematic diagram of a controller circuit illustrating a modified example of an L1 data cache hit path.

With reference to FIG. 5, a schematic diagram of a controller circuit 500 is provided illustrating an example modified L1 data cache hit path to realize the approaches and solutions described herein (the shaded components include the modified portion of the circuit). If a load accesses a califormed byte (which is determined by reading the bit vector in the metadata array 510) an exception indication is generated (by a califormed checker circuit 520), and an exception is recorded to be processed when the load is ready to be committed. Meanwhile, the load returns a pre-determined value for the security byte (for example, a pre-determined value for the security byte may be 0, which is the value that the memory region is initialized to upon deallocation). The reason to return the pre-determined value is to avoid a speculative side channel attack to identify security byte locations. On store accesses to califormed bytes, an exception is reported before the store commits.

Thus, in some embodiments for L1 cache califormed implementation, the controller (be it a dedicated controller circuit or a programmable processor, or a combination thereof) configured to determine whether the data stored in the accessed memory element includes the security data is configured to determining if a flag (which may a flag bit provided in the metadata array 510 of FIG. 5, or may be a flag located elsewhere in the circuity) associated with the accessed memory element (e.g., an L1 cache-based element) is set. In such embodiments, the controller configured to determine whether execution of the process involves access of one or more memory locations in the accessed cache-based element containing the security data is configured to determine, in response to a determination that the flag associated with the accessed memory element is set, locations of the one or more memory locations containing the security data based on a location indicator structure associated with the memory element to indicate the locations of the one or more memory locations. For example, the location indicator structure may include a memory structure (e.g., the bitvector described herein, which may be implemented via the metadata array 510 of FIG. 5) with a length in bits corresponding to a number of bytes of the memory element, with each of the bits of the memory structure being configured to be set to indicate that a respective byte of the memory element associated with that each of the bits contains at least a portion of the security data. If a bit, for a memory location in the cache line that the running process is attempting to access, is set, the califormed checker 520 generates an exception indicator.

In some embodiments, a different blacklisting management approach (referred to herein as the sentinel approach) is taken for L2 cache memory and beyond. The sentinel approach is configured to recognize whether each byte is a security byte with fewer bits than would be required using the L1 metadata formatting approach (which would result in the overall system having to increase the cache area overhead by 12.5%, which may not be acceptable), but generally with a higher latency cost.

Figure 6:
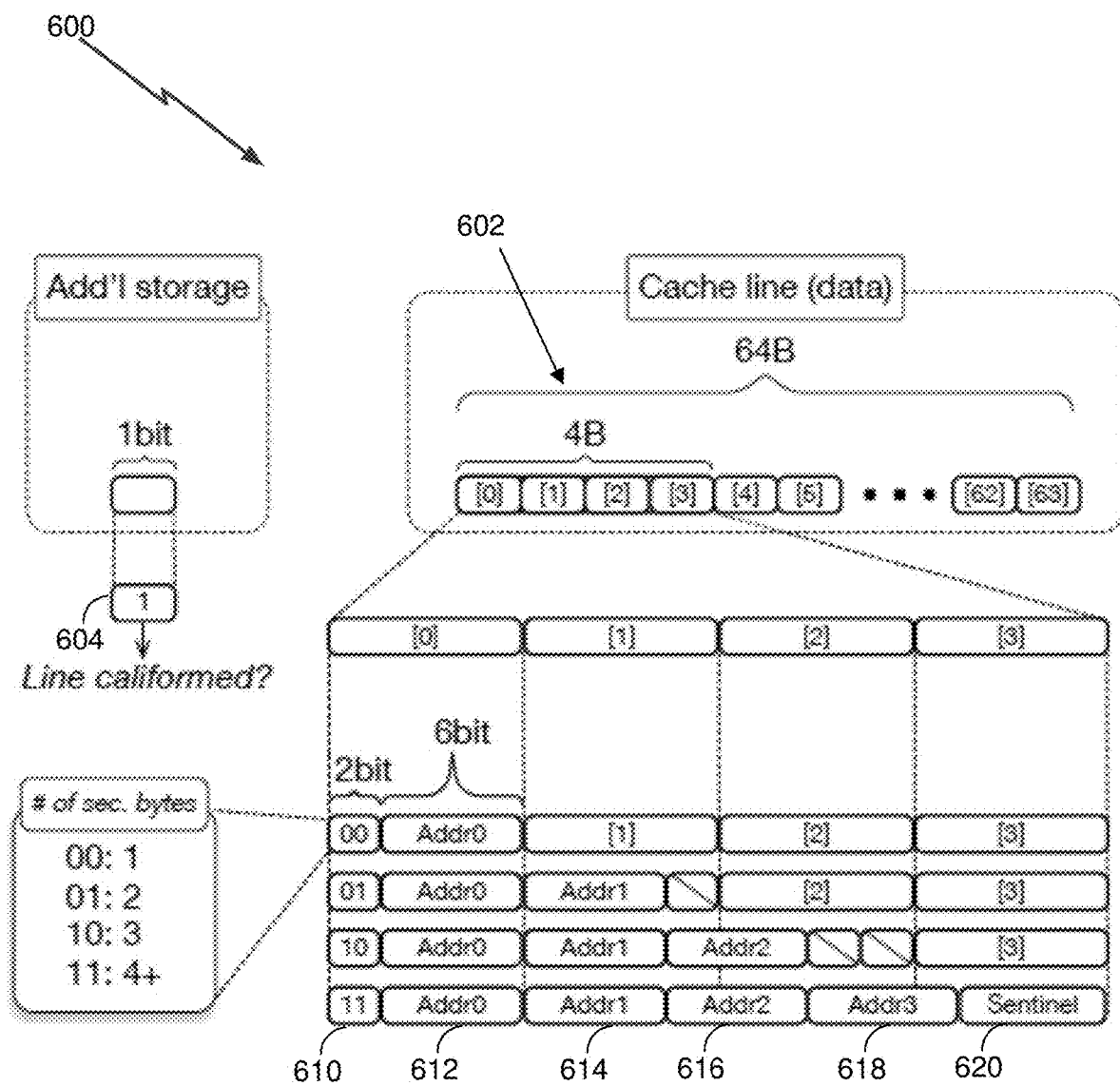
FIG. 6 is a diagram of an example califorms-sentinel re-formatted data line structure.

FIG. 6 is a diagram 600 illustrating an example califorms-sentinel re-formatted data line structure for a data line 602. The coliforms-sentinel reformatted data line includes a 1-bit 604 (representing a 0.2% metadata overhead per 64 B cache line) that indicates if the data line includes blacklisted data. For example, setting that flag to 1 will indicate that the associated data line includes security (blacklisted) data, which in turn would require further analysis and processing with respect to the flagged data line (e.g., determine where the security data is stored, and whether a running process is attempting to access those locations). An important insight that allows overhead savings for implementing a solution to detect impermissible access to data lines with security (blacklisted) data is the following. The number of addressable bytes in a cache line is less than what can be represented by a single byte (generally, only six bits are needed). For example, assume that there is (at least) one security byte in a 64 B data line. Considering a byte granular protection there are at most 63 unique values (bytes) that non-security bytes can have. Therefore, a six-bit pattern can be found which is not present in any of the normal bytes' least (or most) significant six bits. This pattern can be used as a sentinel value to represent the security bytes within the memory line (e.g., at an L2 cache line). If the six-bit sentinel value is stored as additional metadata, the overhead will be seven bits (six bits plus one bit to specify if the cache line is califormed) per cache line. Instead, a new memory line format is proposed which stores the sentinel value within a security byte to reduce the metadata overhead down to one bit per cache line. The idea is to use four different formats depending on the number of security bytes in the cache line, as explained below.

In some example embodiments, califorms-sentinel stores the metadata into the first four bytes (at most) of the 64 B cache line. Two bits of the 0th byte is used to specify the number of security bytes within the cache line: 00, 01, 10 and 11 represent one, two, three, and four or more security bytes, respectively. If there is only one security byte in the cache line, the remaining six bits of the 0th byte are used to specify the location of the security byte (and the original value of the 0th byte is stored in the security byte). Similarly, when there is two or three security bytes in the cache line, the bits of the 1st and 2nd bytes are used to locate them. An important observation is that two bits are gained per security byte since we only need six bits to specify a location in the cache line. Therefore, when there are four security bytes, four addresses can be identified, and there would still be six bits remaining in the first four bytes. These remaining six bits can be used to store a sentinel value, which allows us to have any number of additional security bytes. Thus, for example, in FIG. 6, the first two bits 610 of byte 0 of the data line (whether it is stored in a cache-based memory, or in some other type of memory) indicate the number of security bytes in the data line. An example value of '11' in bits 610 will indicate, for example, four location in the original data line 602 that have security data, and thus the line data is converted into a format in which bytes 0-3 include the 2 bits 610 (indicating number of security bytes in the line), four (4) six-bit segments 612, 614, 616, and 618 containing the locations of the security bytes in a 64 byte line, and a sentinel value (stored in the last six bits 620 of byte 3). The sentinel value may be individually and uniquely determined for each data line re-formatted in accordance with this example approach.

Although the sentinel value depends on the actual values within the 64 B cache line, it works naturally with a write-allocate L1 cache, which is the one of the most commonly used cache allocation policy for microprocessors. The cache line format can be converted upon L1 cache eviction and insertion (califorms-bitvector to/from califorms-sentinel), and the sentinel value only needs to be found upon L1 cache eviction. Also, it is important to note that califorms-sentinel supports critical-word first delivery since the security byte locations can be quickly retrieved by scanning only the first 4 B of the first 16 B. Processes 1 and 2 describe the high-level process used for converting from L1 to L2 Califorms and vice versa.

Figure 7:
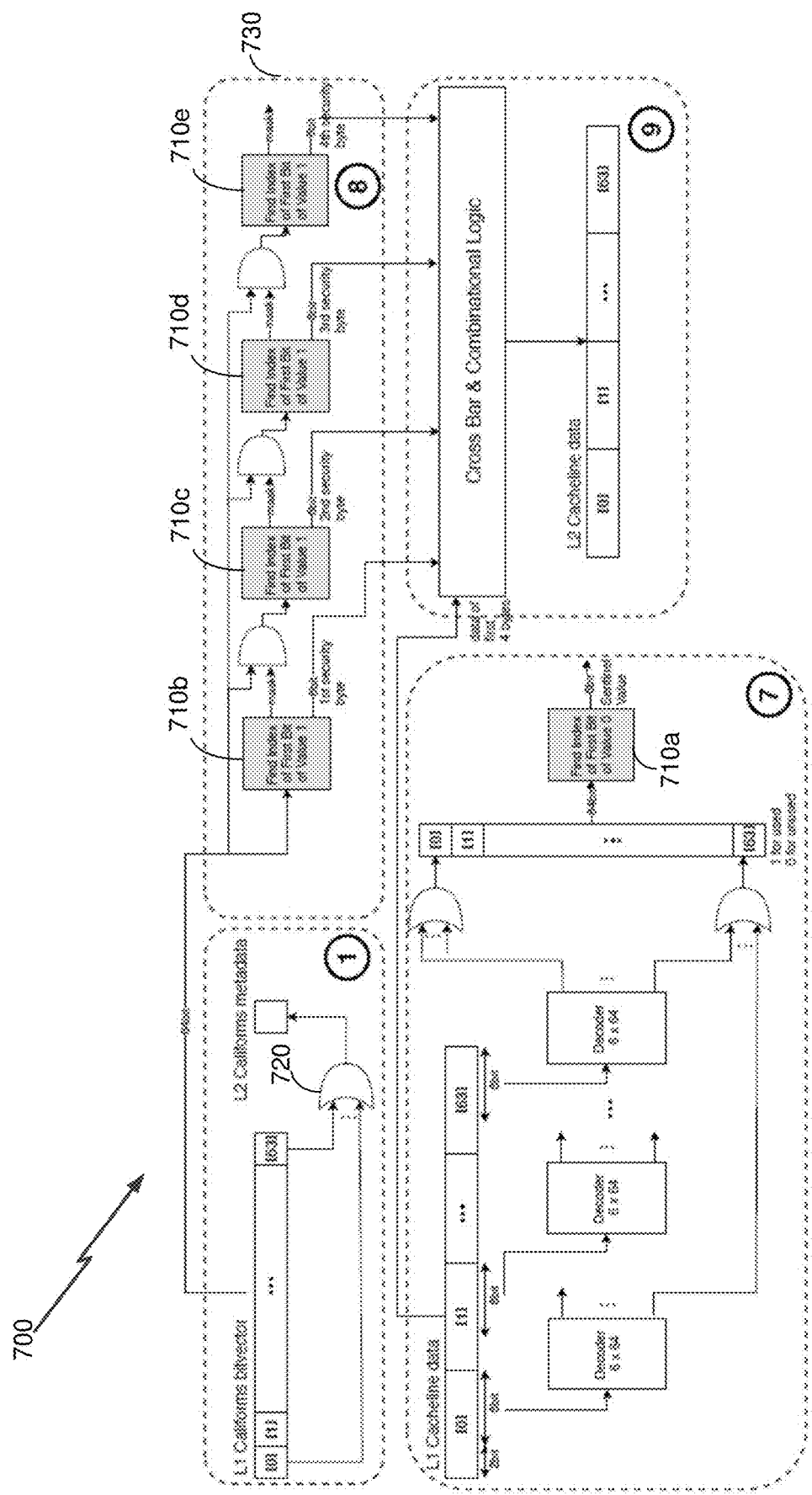
FIG. 7 is a circuit diagram for a spill circuit configured to perform Califorms conversion from the L1 cache (califorms-bitvector) to L2 cache (califorms-sentinel).

FIG. 7 shows a logic diagram for a spill circuit 700 configured to perform Califorms conversion from the L1 cache (califorms-bitvector) to L2 cache (califorms-sentinel). The shaded Find-index blocks 710*a-e* may be constructed using 64 shift blocks followed by a single comparator. The circled numbers in the diagram 700 refer to the corresponding steps in Process 1, provided below.

```
1: Read the Califorms metadata for the evicted line and
     OR them
2: if result is 0 then
3:    Evict the line as is and set Califorms bit to 0
4: else
5:    Set Califorms bit to 1
6:    Perform following operations on the cache line:
7:       Scan least 6-bit of every byte to determine sentinel
8:       Get locations of 1st 4 security bytes
9:       Store data of 1st 4 bytes in locations obtained in 8:
10:      Fill the 1st 4 bytes based on FIG. 6
11:      Use the sentinel to mark the remaining security bytes
12: end
```

Process 1: Califorms Conversion from the L1 Cache (Califorms-Bitvector) to L2 Cache (Califorms-Sentinel)

In the top-left corner of FIG. 7, the califorms metadata for the evicted line is ORed (at 720) to construct the L2 cache (coliforms-sentinel) metadata bit. The bottom-right square details the process of determining sentinel. The 6-bit of every byte are scanned, decoded, and ORed to determine a used values vector. The used-values vector is then processed by a Find-index block to get the sentinel (line 7). The Find-index block takes a 64-bit input vector and searches for the index of the first zero. It is constructed using 64 shift blocks followed by a single comparator. The top-right corner of FIG. 7 shows a circuit 730 logic for getting the locations of the first four security bytes (line 8 of Process 1). It includes four successive combinational Find-index blocks (each detecting one security byte) in the depicted implementation. This logic can be easily pipelined into four stages, if needed, to completely hide the latency of the spill process in the pipeline. Finally, the data of the first four bytes is stored in locations obtained from the Find-index blocks and fill the same four bytes (based on FIG. 6). Thus, in some of the system embodiments described herein, the controller (be it a dedicated controller circuit and/or a programmable controller) is further configured to retrieve from another memory device (e.g., an L1 cache memory device that is evicting one of its memory elements) initial data content to store in the memory element, determine (e.g., based on a flag bit associated with the L1 cache line, or any of the L1 cache line's metadata) if the retrieved initial data content includes the security data. In response a determination that the retrieved data content includes the security data, reformat the retrieved initial data content to a resultant reformatted data content comprising re-arranged actual data, re-arranged and re-formatted security data, and location data identifying locations of the security data in the retrieved initial data content, and set a bit associated with the memory element to a value indicating the memory element storing the resultant reformatted data includes the security data. In some such embodiments, the controller configured to reformat the retrieved initial data content may be configured to identify one or more locations within the retrieved initial data content comprising the security data, determine, based on values of portions comprising the actual data within the retrieved initial data, a unique sentinel value, different from any of the values of the portions comprising the actual data, to represent the reformatted security data, and store at a header portion of the memory element the unique sentinel value and location information identifying the locations of the security data within the retrieved initial data content.

Figure 8:
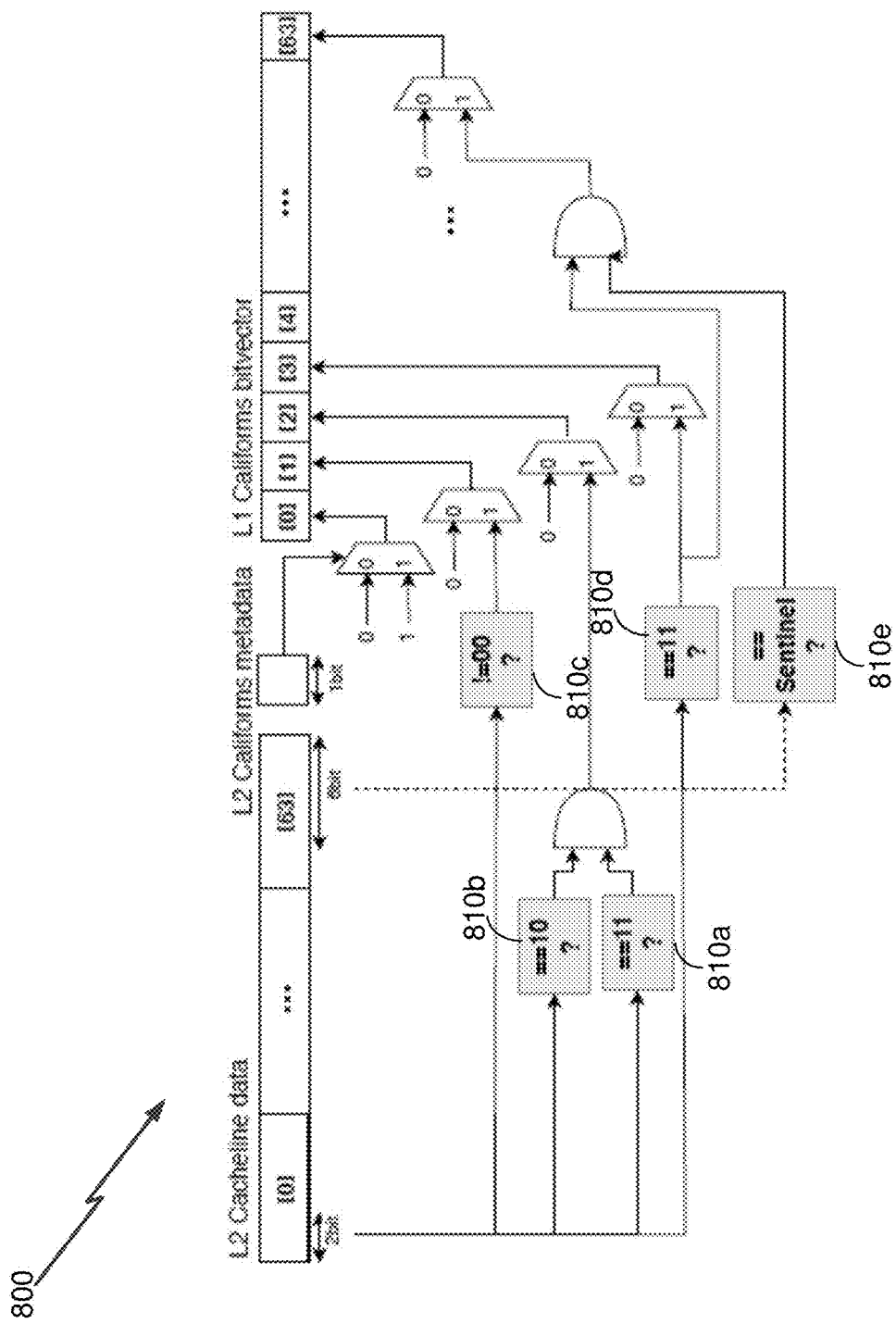
FIG. 8 is a logic circuit diagram of an example implementation for a fill module/circuit.

FIG. 8 is a logic circuit diagram showing an example implementation 800 for a fill module/circuit, implementing Process 2, provided below.

```
1: Read the Califorms bit for the inserted line
2: if result is 0 then
3:    Set the Califorms metadata bit vector to [0]
4: else
5:    Perform following operations on the cache line:
6:       Check the least significant 2-bit of byte 0
7:       Set the metadata of byte[Addr[0-3]] to 1 based on 6:
8:       Set the metadata of byte[byte == sentinel]] to 1
9:       Set the data of byte[0-3] to byte[Addr[0-3]]
10:      Set the new locations of byte[Addr[0-3]] to zero
11: end
```

Process 2: Califorms Conversion from the L2 Cache (Califorms-Sentinel) to L1 Cache (Califorms-Bitvector)

The shaded (≡) blocks 810*a-e* are constructed using logic comparators. The Califorms bit of the L2 inserted line is used to control the value of the L1 cache (califorms-bitvector) metadata. The first two bits of the L2 inserted line are used as inputs for the comparators to decide on the metadata bits of the first four bytes as specified in FIG. 6. In some embodiments, only if those two bits are 11, the sentinel value is read from the fourth byte and fed, with the least 6-bits of each byte, to 60 comparators simultaneously to set the rest of the L1 metadata bits. Such parallelization reduces the latency impact of the fill process.

In some examples, implementations of the blacklisting approaches described herein also requires load/store queue modifications. Since the CFORM instruction discussed above updates the architecture state (writes values), it is functionally a store instruction and handled as such in the pipeline. However, there is a key difference: unlike a store instruction, the CFORM (or BLOC) instruction should not forward the value to a younger load instruction whose address matches within the load/store queue (LSQ) but instead return the value zero. This functionality is required to provide tamper-resistance against side-channel attacks. Additionally, upon an address match, both load and store instructions subsequent to an in flight CFORM instruction are marked for Califorms exception (which is thrown when the instruction is committed).

In order to detect an address match in the LSQ with a CFORM instruction, first a cache line address should be matched with all the younger instructions. Subsequently upon a match, the value stored in the LSQ for the CFORM instruction, which contains the mask value indicating the to-be-califormed bytes, is used to confirm the final match. To facilitate a match with a CFORM instruction, each LSQ entry should be associated with a bit to indicate whether the entry contains a CFORM instruction. Detecting a complete match may take multiple cycles. However, a legitimate load/store instruction should never be forwarded a value from a CFORM instruction, and thus the store-to-load forwarding from a CFORM instruction is not on the critical path of the program (i.e., its latency should not affect the performance). Alternately, if LSQ modifications are to be avoided, the CFORM instructions can be surrounded by memory serializing instructions (i.e., ensure that CFORM instructions are the only in-flight memory instructions).

As noted, in some embodiments, the implementation of the blacklisting approaches and solutions described herein is further aided by some software-support modifications. Some example of software-based support for the implementations of the present disclosure include compiler support, memory allocator changes, and the operating system changes to support califorms.

Consider the issue of dynamic memory management. Two approaches for applying security bytes include (1) dirtybefore-use, in which unallocated memory has no security bytes, and so security bytes are set upon allocation and are unset upon deallocation, or (2) clean-before-use, in which unallocated memory remains filled with security bytes all the time, with the security bytes (in legitimate data locations) cleared upon allocation, and set upon deallocation. Ensuring temporal memory safety in the heap remains a non-trivial problem. Therefore, a reasonable implementation choice is to follow a clean-before-use approach in the heap, so that deallocated memory regions remain protected by califormed security bytes. Additionally, in order to provide temporal memory safety, recently freed regions are not re-allocated until the heap is sufficiently consumed (quarantining). Compared to the heap, the security benefits are limited for the stack since temporal attacks on the stack (e.g., use-after-return attacks) are much rarer. Hence, the dirty-before-use scheme is applied on the stack.

In some examples, the implementations described herein may be supported by compiler-based instrumentation infers of where to place security bytes within target objects, based on their type layout information. The compiler pass can support three insertion policies: the first opportunistic policy supports security bytes insertion into existing padding bytes within the objects, and the other two support modifying object layouts to introduce randomly sized security byte spans that follow the full or intelligent strategies (as described above). The first policy aims at retaining interoperability with external code modules (e.g., shared libraries) by avoiding type layout modification. Where this is not a concern, the latter two policies offer stronger security coverage, exhibiting a tradeoff between security and performance.

Some of the operating system level support that is required for the blacklisting implementations described herein include:

Privileged Exceptions—As the Califorms exception is privileged, the operating system needs to properly handle it as with other privileged exceptions (e.g., page faults). It is assumed that the faulting address is passed in an existing register so that it can be used for reporting/investigation purposes. Additionally, for the sake of usability and backwards compatibility, copying operations, similar in nature to memcpy, need to be accommodated. For example, a simple struct to struct assignment could trigger this behavior, thus leading to a potential breakdown of califormed software. Hence, in order to maintain usability, whitelisting functionality is allowed to suppress the exceptions. This is done by issuing a privileged store instruction to modify the value of exception mask registers before entering and after exiting the piece of code.

Page Swaps—As noted, data with security bytes may be stored in main memory in a califormed format. When a page with califormed data is swapped out from main memory, the page fault handler needs to store the metadata for the entire page into a reserved address space managed by the operating system. The metadata is reclaimed upon swap in. The kernel has enough address space in practice (kernel's virtual address space is 128 TB for a 64-bit Linux with 48-bit virtual address space) to store the metadata for all the processes on the system since the size of the metadata for a 4 KB page consumes only 8 B.

Figure 9:
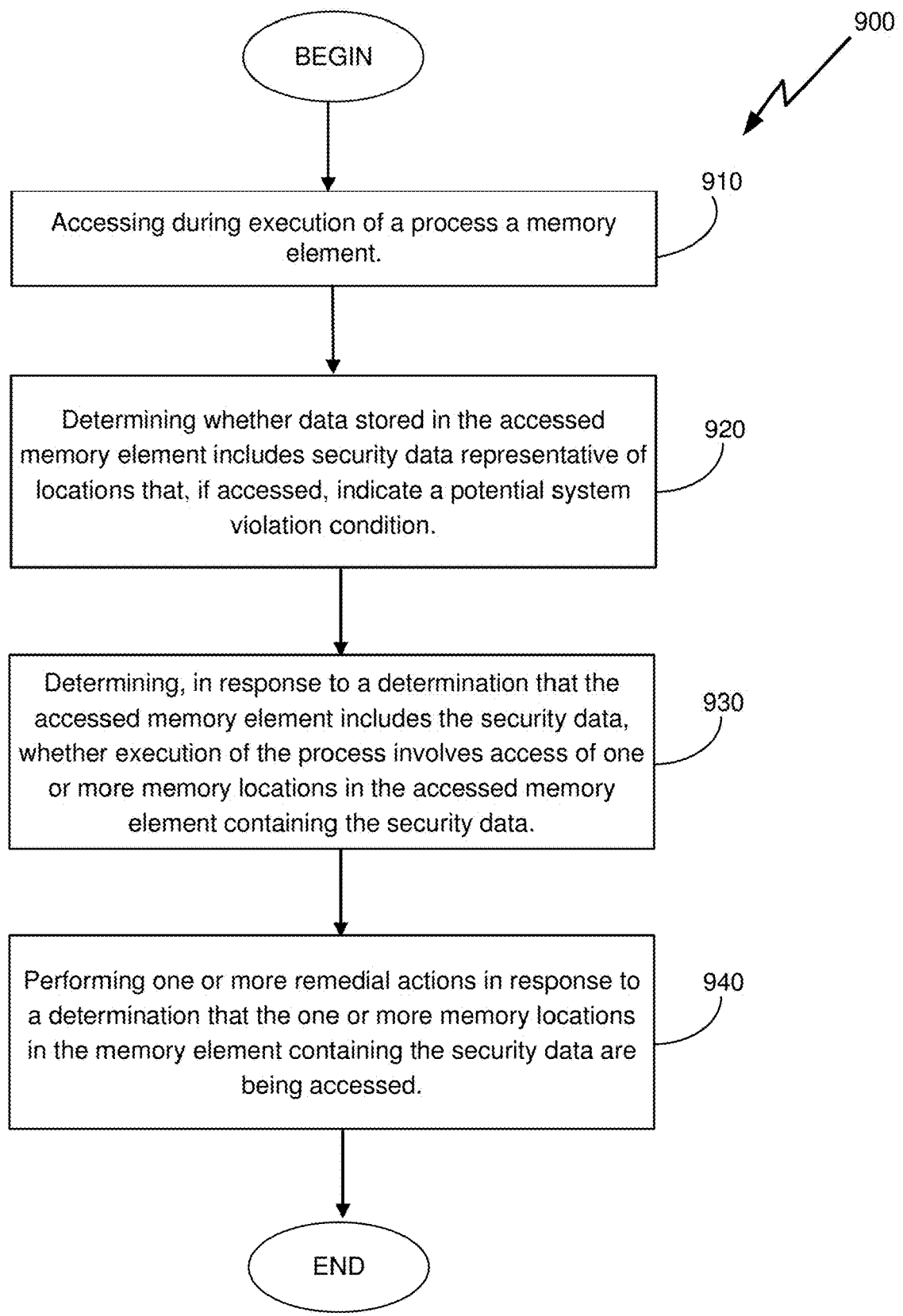
FIG. 9 is a flowchart of an example procedure to implement a blacklisting approach to detect memory access violations.

With reference next to FIG. 9, a flowchart of an example procedure 900 to implement a blacklisting approach used for detecting memory access violations at byte-level granularity is shown. The procedure 900 includes accessing 910 during execution of a process (running, for example, on a programmable processor) a memory element. The memory element may be part of any memory device of a computing system, including elements of DRAM memory (with or without ECC sections), persistent (non-volatile) memory elements, cache-based memory elements, etc. The procedure further includes determining 920 whether data stored in the accessed memory element includes security data representative of locations that, if accessed, indicate a potential system violation condition. The determination of whether data stored in the memory element includes security data can be performed by controller circuitry (such as the controller circuitry depicted in FIGS. 7 and 8 with respect to the circuitry used for cache-level memory elements), by a processor-based device (e.g., a programmable controller), or by some combination of a programmable and dedicated controller circuitry.

As further shown in FIG. 9, the procedure 900 additionally includes determining 930, in response to a determination that the accessed memory element includes the security data (as determined at operation 920), whether execution of the process involves access of one or more memory locations in the accessed memory element containing the security data.

In some embodiments, determining whether the data stored in the accessed memory element includes the security data may include determining if a flag associated with the accessed memory element is set. In some examples, the flag (for a particular memory element) may include one or more of, for example, a cache overhead bit associated with a cache line in cache memory when the memory element is a cache-line memory element, an error correction code (ECC) bit located in an ECC section of a first DRAM memory device or cache memory implementing ECC functionality when the memory element is a memory element of the first DRAM device or a cache memory, and/or a reserved bit in a second DRAM memory device without an ECC section when the memory element is a memory element of the second DRAM memory device.

In some examples, determining whether execution of the process involves access of one or more memory locations in the accessed cache-based element containing the security data may include determining, in response to a determination that the flag associated with the accessed memory element is set, locations of the one or more memory locations containing the security data based on a location indicator structure associated with the memory element, indicating the locations of the one or more memory locations (a location indicator structure, which adds to overhead associated with memory, but can improve latency performance, may be used for specific memory devices, such as L1 cache level devices, where response speed is paramount; however, such a structure may be used for all other types of memory devices). For example, the location indicator structure may include a memory structure with a length in bits corresponding to a number of bytes of the memory element, with each of the bits of the memory structure being configured to be set to indicate that a respective byte of the memory element associated with that each of the bits contains at least a portion of the security data.

In some embodiments (and as also illustrated and discussed with respect to FIG. 7), the procedure 900 may further include retrieving from another memory device initial data content to store in the memory element, and determining if the retrieved initial data content includes the security data. In response a determination that the retrieved data content includes the security data, reformatting the retrieved initial data content to a resultant reformatted data content comprising re-arranged actual data, re-arranged and re-formatted security data, and location data identifying locations of the security data in the retrieved initial data content, and setting a bit associated with the memory element to a value indicating the memory element storing the resultant reformatted data includes the security data. In some implementations, reformatting the retrieved initial data content may include identifying one or more locations within the retrieved initial data content comprising the security data, determining, based on values of portions comprising the actual data within the retrieved initial data, a unique sentinel value, different from any of the values of the portions comprising the actual data, to represent the reformatted security data, and storing at a header portion of the memory element the unique sentinel value and location information identifying the locations of the security data within the retrieved initial data content. In some such examples, the memory element may include an L2 level or higher-level memory element, and retrieving from the other memory device the initial data content may include retrieving from an L1 level cache memory the initial data content upon eviction of an L1 cache line containing the initial data content.

With continued reference to FIG. 9, the procedure 900 further includes performing one or more remedial actions in response to a determination that the one or more memory locations in the memory element containing the security data are being accessed. In some examples, performing one or more remedial actions may include one or more of, for example, raising an exception, disabling the process, and/or notifying a user of the potential system violation condition. Determining whether the data stored in the accessed memory element includes security data may include determining by a hardware-based detection circuit coupled to L1-level cache memory elements whether a bit associated with the accessed memory element is set.

In some examples, performing the one or more remedial actions in response to the determination that the one or more memory locations in the accessed memory element containing the security data are being accessed may include triggering another process with a higher or same privilege level as a particular privilege level associated with the process, to handle occurrence of the potential system violation condition. Triggering the other process may include communicating to the other process information about access of the memory element, including one or more of, for example, a program counter value, timing information for the access of the memory element, and/or other information.

In some embodiments, the security data may be stored in one or more memory locations within memory regions allocated for storing data structures (thus allowing blacklisting of memory structures at byte granularity). In some embodiments, the procedure 900 may further include controlling the security data stored in the memory element through execution of an instruction set architecture instruction 'BLOC R1, R2, R3' (or alternatively execute the instruction 'CFORM R1, R2, R3'), configured to blacklist memory locations at byte granularity and raise a privileged exception upon misuse of blacklisted locations, with R1 representing identity of a first register storing a pointer value pointing to a starting address of the memory element in a virtual address space, R2 representing identity of a second register storing a flag value indicating whether the memory element includes the security data, and R3 representing identity of a third register storing a mask identifying the one or more location in the memory element comprising the security data.

Performing the various operations described herein may be facilitated by a programmable controller system (e.g., a processor-based controller system). Particularly, at least some of the various devices, systems, and/or circuits described herein, including at least some of the circuitry to populate memory elements with security data (i.e., blacklist/ califormed data), determine whether one or more memory locations have security data, determine and respond to possible system violations due to attempts to access forbidden memory locations, re-format/re-configure content in memory elements, etc., may be implemented, at least in part, using one or more processor-based devices.

Figure 10:
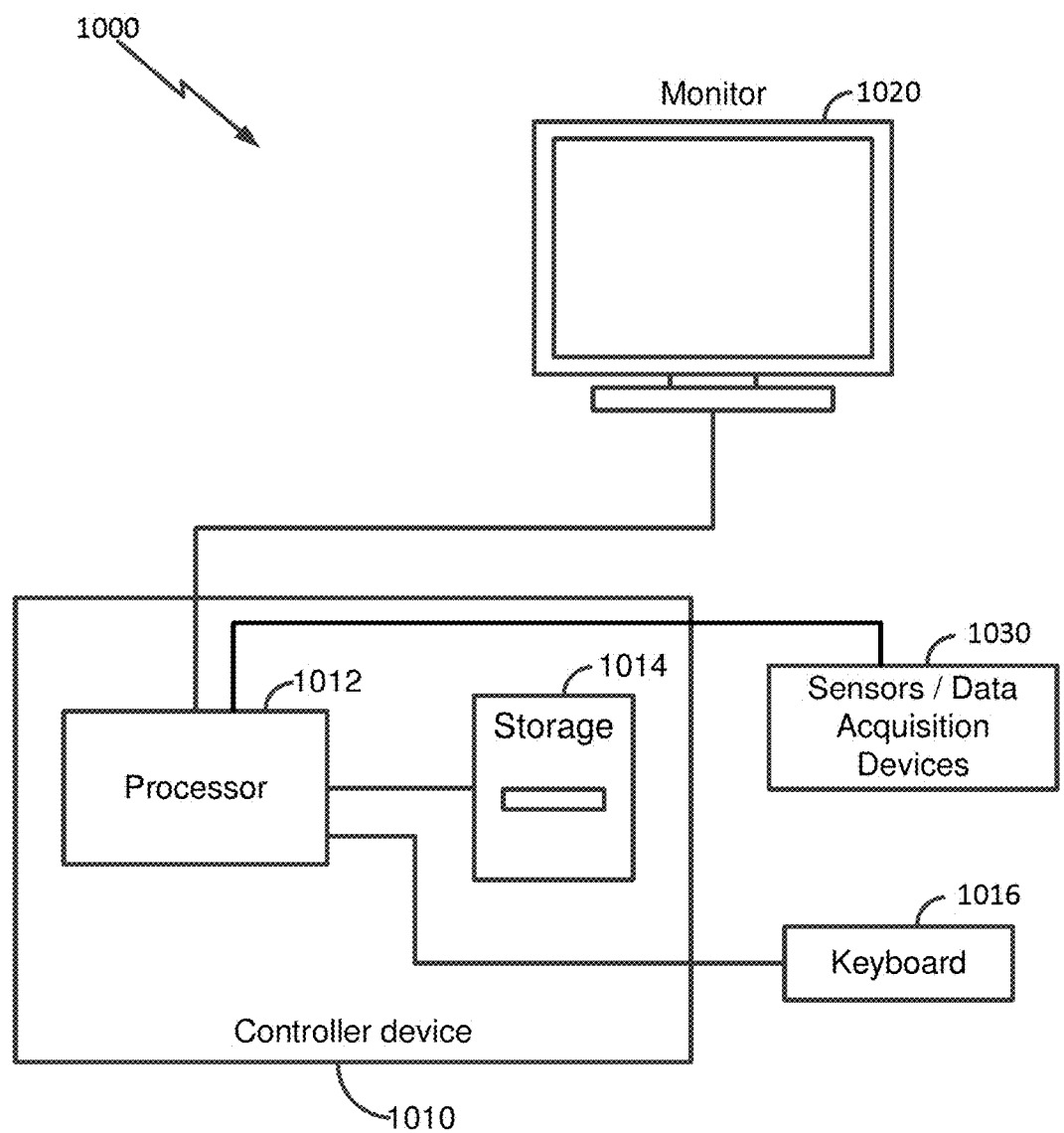
FIG. 10 is a schematic diagram of a computing system.

Thus, with reference to FIG. 10, a schematic diagram of a computing system 1000 is shown. The computing system 1000 includes a processor-based device (also referred to as a controller device) 1010 such as a personal computer, a specialized computing device, a mobile device (e.g., a smartphone) and so forth, that typically includes a central processor unit 1012, or some other type of controller. In addition to the CPU 1012, the system includes main memory, cache memory and bus interface circuits (not shown in FIG. 10). At least some elements of the CPU 1012 may be configured to allow the implementation of managing and responding to blacklisted memory locations, as described herein.

The processor-based device 1010 may include a mass storage element 1014, such as a hard drive (realized as magnetic discs, solid state (semiconductor) memory devices, and so on), flash drive associated with the computer system, etc. The computing system 1000 may further include a keyboard 1016, or keypad, or some other user input interface, and a monitor 1020, e.g., an LCD (liquid crystal display) monitor, that may be placed where a user can access them. The computing system 1000 may also include one or more sensors or data acquisition devices 1030 such as, for example, an image-capture device (e.g., a digital camera), a wireless or wired transceiver to receive data and control transmissions from remote devices, inertial sensors, etc.

The processor-based device 1010 is configured to facilitate, for example, protection against data breaches and against other types of anomalous conditions. The storage device 1014 may thus include a computer program product that when executed on the processor-based device 1010 causes the processor-based device to perform operations to facilitate the implementation of procedures and operations described herein. The processor-based device may further include peripheral devices to allow input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively or additionally, in some embodiments, special purpose logic circuitry, e.g., an FPGA (field programmable gate array), an ASIC (application-specific integrated circuit), a DSP processor, a GPU, etc., may be used in the implementation of the system 1000. Other modules that may be included with the processor-based device 1010 are speakers, a sound card, a pointing device, e.g., a mouse or a trackball, by which the user can provide input to the computing system 1000. The processor-based device 1010 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. Non-transitory computer readable media can include media such as magnetic media (such as hard disks, floppy disks, etc.), optical media (such as compact discs, digital video discs, Blu-ray discs, etc.), semiconductor media (such as flash memory), electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, and circuits, and/or any suitable intangible media.

In some implementations, a computer accessible non-transitory storage medium includes a database (also referred to as a "design structure" or "integrated circuit definition dataset") representative of a system/architecture including some or all of the components of the control circuitry to implement blacklisted memory content to protect against rogue memory accesses. In general, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL, or some other language. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

To test and evaluate the performance of some of the implementations described herein, several studies, simulations, and experiments were conducted. For the security evaluation of the implementations described herein, a threat model comparable to that used in contemporary related works was assumed. Particularly, it was assumed that a victim program has one or more vulnerabilities that an attacker can exploit to gain arbitrary read and write capabilities in the memory. Furthermore, it was assumed that the adversary has access to the source code of the program, and therefore the adversary is able to glean all source-level information and/or deterministic compilation results from it (e.g., find code gadgets within the program and determine non-califormed layouts of data structures). However, the adversary does not have access to the host binary (e.g., server-side applications). Finally, it was assumed that all hardware is trusted: it does not contain and/or is not subject to bugs arising from exploits such as physical or glitching attacks. Due to its recent rise in relevance however, side channel attacks are considered in terms of the design of the implementations described herein, as coming within the purview of the threat model. Specifically, attack vectors seeking to leak the location and value of security bytes are assumed.

A key feature of califorms as a metadata-based safety mechanism is the absence of programmer visible metadata in the general case (apart from a metadata bit in the page information maintained by higher privilege software). Beyond the implications for its storage overhead, this also means that the techniques discussed herein are immune to attacks that explicitly aim to leak or tamper the metadata to bypass the respective defense. This, in turn, implies a smaller attack surface so far as software maintenance of metadata is concerned.

Califorms's capability of fine-grained memory protection is the key enabler for intra-object overflow detection. However, a byte granular mechanism is not enough for protecting bit-fields without turning them into char bytes functionally. This should not be a major detraction since security bytes can still be added around composites of bit-fields.

Califorms' hardware modifications affect the memory hierarchy. Hence, its protection is lost whenever one of its layers is bypassed (e.g., when heterogeneous architectures or DMA is used). Mitigating this requires that these mechanisms always respect the security byte semantics by propagating them along the respective memory structures and detecting accesses to them. If the process used for califorming is used by accelerators, then attacks through heterogeneous components can also be averted. The present implementations also take multiple steps to be resilient to side channel attacks. Firstly, timing variances introduced due to hardware modifications are avoided in order to avoid timing-based side channel attacks. Additionally, to avoid speculative execution side channels ala Spectre, the implementations return zero on a load to a security byte, thus preventing speculative disclosure of metadata. This can be further augmented by requiring that deallocated objects (heap or stack) be zeroed out in software. This is done in order to avoid the following attack scenario: consider a case in which the attacker somehow knows that the padding locations should contain a non-zero value (for instance, because the attacker knows the object allocated at the same location prior to the current object had non-zero values). However, while speculatively disclosing memory contents of the object, the attacker discovers that the padding location contains a zero instead. As such, the attacker can infer that the padding there contains a security byte. If deallocations were accompanied with zeroing, however, this assumption would not hold.

The implementations described herein may also be configured to mitigate software attacks, such as coverage-based attacks, whitelisting attacks, and de-randomization attacks. For califorming the padding bytes (in an object), it is necessary to know the precise type information of the allocated object. This is not always possible in C-style programs where void* allocations may be used. In these cases, the compiler may not be able to infer the correct type, in which case intra-object support may be skipped for such allocations. Similarly, the metadata insertion policies (viz., intelligent and full) require changes to the type layouts. This means that interactions with external modules that have not been compiled with califorms support may need (de)serialization to remain compatible. For an attacker, such points in execution may appear lucrative because of inserted security bytes getting stripped away in those short periods. However, the opportunistic policy can still remain in place to offer some protection. On the other hand, for those interactions that remain oblivious to type layout modifications (e.g., passing a pointer to an object that shall remain opaque within the external module), the hardware-based implicit checks have the benefit of persistent tampering protection, even across binary module boundaries.

The concession of allowing whitelisting of certain functions was necessary to make Califorms more usable in common environments without requiring significant source modifications. However, this also creates a vulnerability window wherein an adversary can piggy-back on these functions in the source to bypass the implemented protection framework. To confine this vector, the number of whitelisted functions is kept as minimal as possible. Additionally, since Califorms can be bypassed, if an attacker can guess a security bytes location, it is important that it be placed unpredictably. For the attacker to carry out a guessing attack, the attacker first needs to obtain the virtual memory address of the object they want to corrupt, and then overwrite a certain number of bytes within that object. To know the address of the object of interest, the attacker typically has to scan the process' memory: the probability of scanning without touching any of the security bytes is $(1-P/N)^O$, where O is number of allocated objects, N is the size of each object, and P is number of security bytes within that object. With 10% padding (P/N=0.1), when O reaches 250, the attack success goes to $10^{-20}$. If the attacker can somehow reduce O to 1, which represents the ideal case for the attacker, the probability of guessing the element of interest is $1/7^n$ (since 1-7 wide security bytes can be inserted), compounding as the number of paddings to be guessed as (=n) increases. The randomness is, however, introduced statically akin to randstruct plugin introduced in recent Linux kernels, which randomizes structure layout of those which are specified (it does not offer detection of rogue accesses unlike Califorms do). The static nature of the technique may make it prone to brute force attacks like BROP which repeatedly crashes the program until the correct configuration is guessed. This could be prevented by having multiple versions of the same binary with different padding sizes or simply by better logging, when possible. Another mitigating factor is that BROP attacks require specific type of program semantics, namely, automatic restart-after-crash with the same memory layout. Applications with these semantics can be modified to spawn with a different padding layout, and yet satisfy application level requirements.

Next, performance evaluation of the present implementations is discussed. The califorms implementations described herein add additional state and operations to the L1 data cache and the interface between the L1 and L2 caches. It is useful, therefore, to evaluate the access latency impact of the additional states and operations. Qualitatively, the metadata area overhead of L1 Califorms is 12.5%, and the access latency should not be impacted as the metadata lookup can happen in parallel with the L1 tag access; the L1 to/from L2 califorms conversion should also be simple enough so that its latency can be completely hidden. However, the metadata area overhead can increase the L1 tag access latency and the conversions might add little latency. Without loss of generality, the access latency impact of adding califorms-bitvector on a 32 KB direct mapped L1 cache is measured in the context of a typical energy optimized tag, data, formatting L1 pipeline with multicycle fill/spill handling. For the implementation evaluated, a 65 nm TSMC core library is used, and the SRAM arrays are generated with the ARM Artisan memory compiler. FIG. 11 provides a table 1100 summarizing the results for the L1 Califorms (califorms-bitvector). As expected, the overheads associated with the califorms bitvector are minor in terms of delay (1.85%) and power consumption (2.12%). The SRAM area was found to be the dominant component in the total cache area (around 98%), where the overhead was 18.69%, higher than 12.5%. The results of fill/spill modules are reported separately in the right-hand side of the table 1100. The latency impact of the fill operation is within the access period of the L1 design. Thus, the califorming operation can be folded completely within the pipeline stages that are responsible for bringing cache lines from L2 to L1.

The timing delay of the (less performance sensitive) spill operation was larger than that of the fill operation (5.5 ns vs. 1.4 ns) as pure combinational logic was used to construct the califorms-sentinel format in one cycle, as shown in FIG. 7. This cycle period can be reduced by dividing the operations of Process 1 (particularly lines 7 to 11) into two or more pipeline stages. For instance, getting the locations of the first four security bytes (line 8) includes four successive combinational blocks (each detecting one security byte) in the evaluated implementation. This logic can be easily pipelined into four stages. Therefore, the latency of both the fill and spill operations can be minimal (or completely hidden) in the pipeline.

Figure 13:
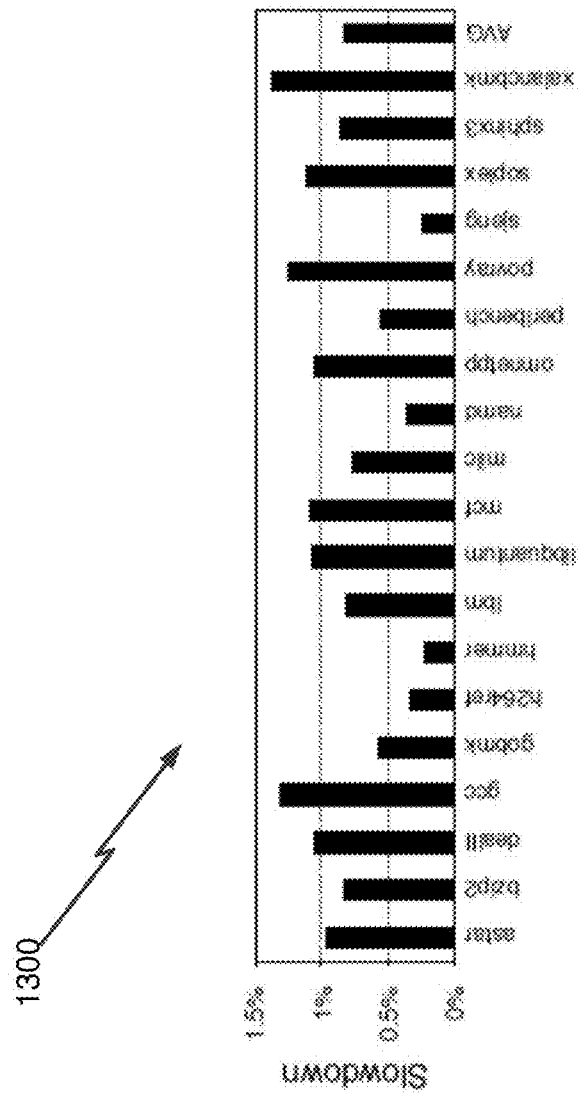
FIG. 13 is a graph showing slowdown results with additional one-cycle access latency for both L2 and L3 caches.

Results from a VLSI implementation imply that there will be no additional L2/L3 latency imposed by implementing the Califorms solution. However, this might not be the case depending on several implementation details (e.g., target clock frequency) so it may be (pessimistically) assumed that the L2/L3 access latency incurs additional one cycle latency overhead. In order to evaluate the performance of the additional latency posed by Califorms, detailed microarchitectural simulations were performed. Specifically, ZSim was used as the processor simulator, and PinPoints with Intel Pin were used to select representative simulation regions of SPEC CPU2006 benchmarks with ref inputs compiled with Clang version 6.0.0 with "'O3-fno-strict-aliasing" flags. No simulator warmup was done upon executing each SimPoint region, but instead a relatively large interval length of 500 M instructions was used to avoid any warmup issues. MaxK, used in SimPoint region selection, was set to 30. Table 1200, provided in FIG. 12, shows the hardware configuration parameters of the processor, an Intel Westmere-like out-of-order core, used for the simulation. The processor was validated against a real system whose performance and microarchitectural events to be commonly within 10%. The performance was evaluated when both L2 and L3 caches incur additional latency of one cycle. FIG. 13 is a graph 1300 showing slowdown results with additional one-cycle access latency for both L2 and L3 caches. As shown in FIG. 13, slowdowns ranged from 0.24 (hmmer) to 1.37%

(xalancbmk). The average performance slowdown was 0.83%, which is negligible and is well in the range of error when executed on real systems.

The evaluations revealed that the hardware modifications required to implement Califorms solutions added little or no performance overhead. Next, the overheads incurred by the two software-based modifications changes required to implement intra-object memory safety with Califorms (namely, the effect of underutilized memory structures, e.g., caches, due to additional security bytes, and the additional work necessary to issue CFORM instructions and the overhead of executing the instructions themselves) were evaluated.

The experiments were run on an Intel Skylake-based Xeon Gold 6126 processor running at 2.6 GHz with RHEL Linux 7.5 (kernel 3.10). DealII and omnetpp were omitted since the shared libraries installed on RHEL are too old to execute these two Califorms enabled binaries, and gcc was also omitted since it fails when executed with the memory allocator with inter-object spatial and temporal memory safety support. The remaining 16 SPEC CPU2006 C/C++ benchmarks were compiled with our modified Clang version 6.0.0 with "—O3-fno-strict-aliasing" flags. Ref inputs were used and run to completion. Rach benchmark-input pair was run five times and the shortest execution time was used as its performance. For the benchmarks with multiple ref inputs, the sum of the execution time of all the inputs were used as their execution times.

The performance impact of executing a CFORM (BLOC) instruction was estimated by emulating it with a dummy store instruction that writes some value to the corresponding cache line's padding byte. Since one CFORM instruction can caliform the entire cache line, issuing one dummy store instruction for the to-be-califormed cache line suffices. In order to issue the dummy stores, a LLVM pass was implemented to instrument the code to hook into memory allocations and deallocations. The type information was retrieved to locate the padding bytes, the number of dummy stores and the addresses they access calculated, and finally emitted. Therefore, all the software overheads needed to implement Califorms is accounted for in this evaluation. For the random sized security bytes, three variants were evaluated by fixing the minimum size to one byte while varying the maximum size to three, five, or seven bytes (i.e., on average the amount of security bytes inserted are two, three and four bytes, respectively). In addition, in order to account for the randomness introduced by the compiler, three different versions of binaries were generated for the same setup (e.g., three versions of astar with random sized paddings of minimum one byte and maximum three bytes). The error bars in FIGS. 14A-B represent the minimum and the maximum execution times among 15 executions (three binaries× five runs) and the average of the execution times is represented as the bar.

FIG. 14A includes a graph 1400 showing the slowdown incurred by three set of strategies: full insertion policy (with random sized security bytes) without CFORM instructions, the opportunistic policy with CFORM instructions, and the full insertion policy with CFORM instructions. Since the first strategy does not execute CFORM instructions it does not offer any security coverage, but is shown as a reference to showcase the performance breakdown of the third strategy (cache underutilization vs. executing CFORM instructions). First, and focusing on the three variants of the first strategy (shown in the three left most bars) it can be seen that different sizes of random sized security bytes do not make a large difference in terms of performance. The average slowdown of the three variants for the policy without CFORM instructions are 5.5%, 5.6% and 6.5%, respectively. Therefore, in order to achieve higher security coverage without losing performance, using a random-sized bytes of, with minimum of one byte and maximum of seven bytes, is promising. When focusing on individual benchmarks, it can be seen that a few benchmarks, including h264ref, mcf, mile and omnetpp, incur noticeable slowdowns (ranging from 15.4% to 24.3%).

Next, the opportunistic policy with CFORM instructions is examined, which is shown in the middle (fourth) bar. Since this strategy does not add any additional security bytes, the overheads are purely due to the work required to setup and execute CFORM instructions. The average slowdown of this policy is 7.9%. There are benchmarks which encounter a slowdown of more than 10%, namely gobmk, h264ref and perlbench. The overheads are due to frequent allocations and deallocations made during program execution, where the programs have to calculate and execute CFORM instructions upon every event (since every compound data type will be/was califormed). For instance, perlbench is notorious for being malloc-intensive, and reported as such elsewhere. Lastly the third policy, the full insertion policy with CFORM instructions, offers the highest security coverage in Califorms based system with the highest average slowdown of 14.0% (with the random sized security bytes of maximum seven bytes). Nearly half (seven out of 16) the benchmarks encounter a slowdown of more than 10%, which might not be suitable for performance-critical environments, and thus a user might want to consider the use of the intelligent insertion policy. FIG. 14B includes a graph 1450 showing the slowdowns of the intelligent insertion policy with random sized security bytes (with and without CFORM instructions, in a similar manner to that conducted to generate the graph 1400 of FIG. 14A). First, the focus is placed on the strategy without executing CFORM instructions (the three bars on the left). The performance trend is similar such that the three variants with different random sizes have little performance difference, where the average slowdown is 0.2% with the random sized security bytes of maximum seven bytes. It can be seen that none of the programs incurs a slowdown of greater than 5%. Finally, with CFORM instructions (three bars on the right), gobmk and perlbench have slowdowns of greater than 5% (16.1% for gobmk and 7.2% for perlbench). The average slowdown is 1.5%, where considering its security coverage and performance overheads the intelligent policy might be the most practical option for many environments.

Figure 15:
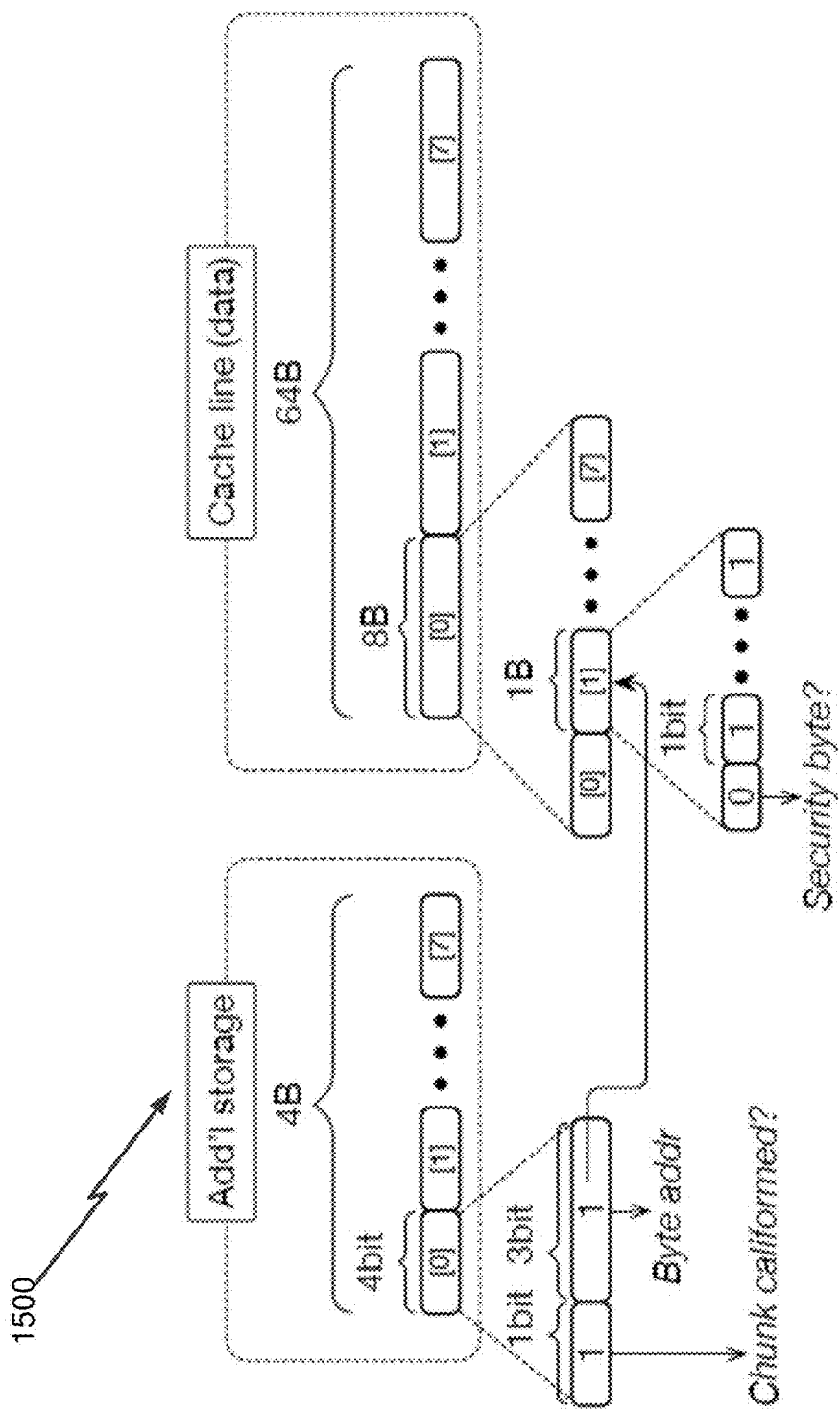
FIG. 15 is a diagram of a caliform-bitvector variant that stores a bit vector inside security byte locations.

Lastly, it is noted that there can be many different califormed variants. Two such additional examples of califorms-bitvector variants are provided below for illustration purposes only, but other implementations and variants are possible. The two additional bitvector variants are designed for the L1 cache, and have less storage overhead (but with additional complexity) compared to the bitvector variant described above. Specifically, a first variant is the califorms-4 B. This variant has 4 B of additional storage per 64 B cache line. This califorms stores the bit vector within a security byte (illustrated in FIG. 15). Since a single byte bit vector (which can be stored in one security byte) can represent the state for 8 B of data, the 64 B cache line is divided into eight 8 B chunks. If there is at least one security byte within an 8 B chunk, and one of those bytes is used to store the bit vector which represents the state of the chunk. For each chunk, four additional bits of storage need to be added. One bit to represent whether the chunk is califormed (contains a security byte), and three bits to specify which byte within the chunk stores the bit vector. Therefore, the additional storage is 4 B (4-bit×8 chunks) or 6.25% per 64 B cache line. FIG. 15 highlights the chunk [0] being califormed where the corresponding bit vector is stored in byte [1].

Figure 16:
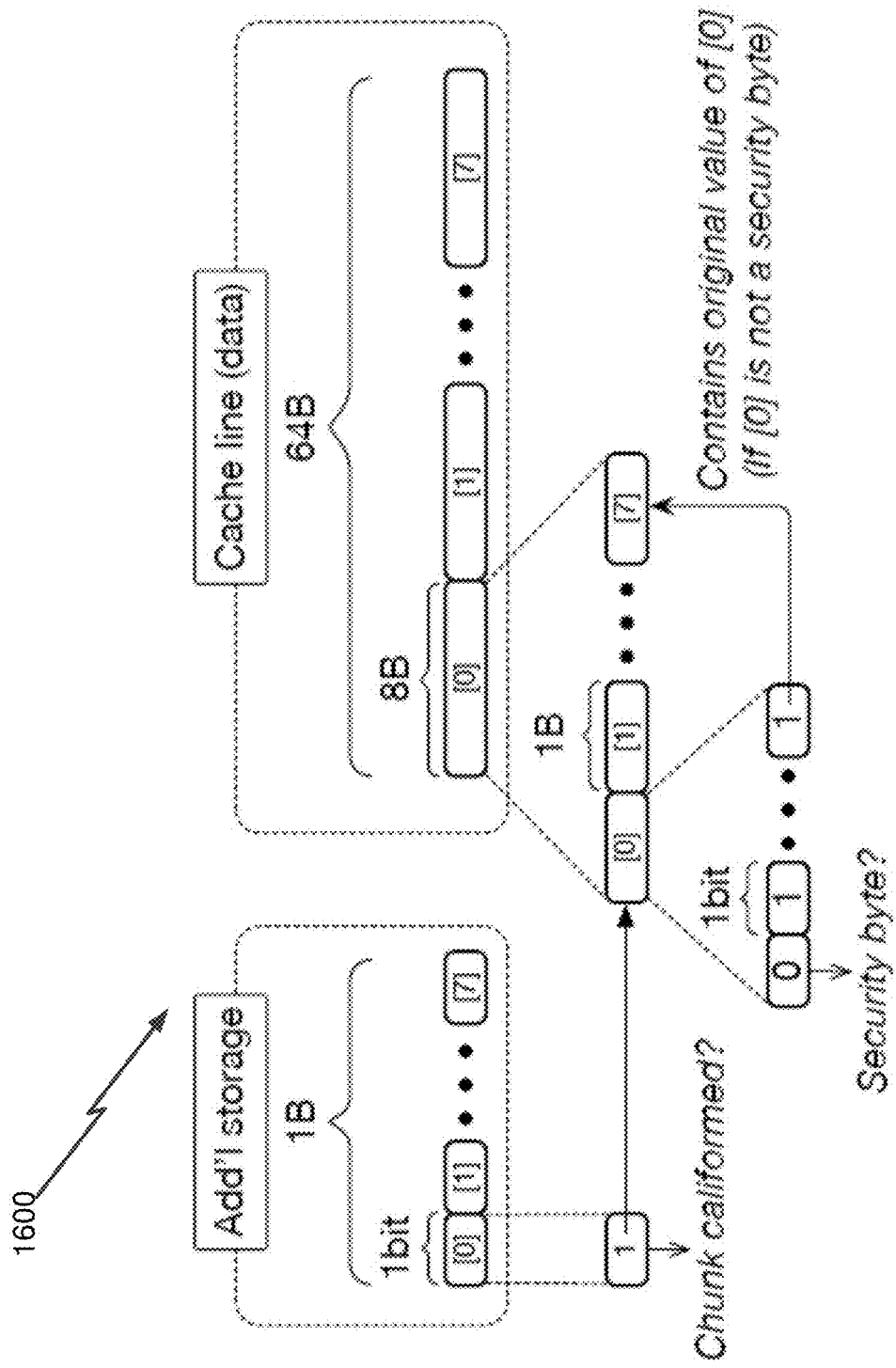
FIG. 16 is a diagram of another caliform-bitvector variant that stores a bit vector in the header byte of a data line.

Another example variant is the califorms-1 B variant. The metadata overhead can further be reduced by restricting where we store the bit vector within the chunk (illustrated in FIG. 16). The idea is to always store the bit vector in a fixed location (the 0th byte in the figure, or the header byte; similar idea used in califorms-sentinel). If the 0th byte is a security byte this works without additional modification. However, if the 0th byte is not a security byte, its original value needs to be saved somewhere else so that it can be retrieved when required. For this purpose, one of the security bytes is used (e.g., the last security byte is chosen in the figure). This way, three bits of metadata can be eliminated per chunk to address the byte which contains the bit vector. Therefore, the additional storage is 1 B or 1.56% per 64 B cache line. As with FIG. 15, the figure highlights the chunk [0] being califormed (where the corresponding bit vector is stored in the first byte) and the original value of byte [0] stored in the last security byte, byte [7], within the chunk.

Figure 17:
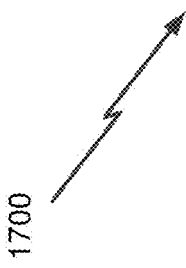
FIG. 17 is a table summarizing performance results for the bit-vector variants of FIGS. 15 and 16.

A similar VLSI evaluation discussed above was performed shown for the two additional califorms-bitvector variants. The results are presented in Table 1700 of FIG. 17. As can be seen, califorms-bitvectors with 4 B and 1 B overheads incur 47% and 20% of extra delay, respectively, upon L1 hit, compared to the califorms-bitvector with 8 B overhead (49% and 22% additional delay compared to the baseline L1 data cache without Califorms). Also, both califorms-bitvector add almost the same overheads upon spill and fill operations (compared to the califorms-bitvector with 8 B overhead) which are 9% delay and 30% energy for spill, and 34% delay and 17% energy for fill operations. The performance evaluation reveals that califorms-bitvector with 1 B overhead outperforms the other with 4 B overhead both in terms of additional storage and access latency/energy. The reason is due to the design restriction of fixing the location of the header byte which allows faster lookup of the bit vector in the security byte. Califorms-bitvector with 1 B overhead can be a good alternative in domains where area budget is tighter and/or less performance critical, e.g., embedded or IoT systems.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   fetching during execution of a process a memory element comprising multiple bytes, wherein at least one of the multiple bytes of the memory element is a blacklisted byte that, if accessed, triggers a system violation condition, and wherein at least another byte of the memory element is not blacklisted and is accessible without triggering a system violation condition;
   determining whether data stored in the memory element includes security data in one or more blacklisted bytes located within the memory element that, if the one or more blacklisted bytes are accessed, indicate a potential system violation condition, wherein determining whether the data in the memory element includes security data comprises determining locations within the memory element containing the security data, including:
      identifying, when the memory element is located outside the L1 cache, the blacklisted bytes within the memory elements that, when accessed cause the system violation condition, hold a sentinel value that is uniquely determined for that memory element based on values of the non-blacklisted bytes of the memory element that are accessible without triggering the system violation condition;
   determining, in response to a determination that the memory element includes the one or more blacklisted bytes within the memory element containing the security data, whether execution of the process involves attempting to access at least one byte of the one or more blacklisted bytes located within the memory element;
   performing one or more remedial actions in response to a determination that execution of the process involves attempting to access the at least one byte of the one or more blacklisted bytes located within the memory element; and
   permitting access of a non-blacklisted byte of the memory element in response to a determination that the execution of the process does not involve attempting to access any of the one or more blacklisted bytes located within the memory element.

2. The method of claim 1, wherein determining whether the data stored in the memory element includes the security data comprises:
   determining if a flag associated with the memory element is set.

3. The method of claim 2, wherein the flag includes one or more of: a cache overhead bit associated with a cache line in cache memory when the memory element is a cache-line memory element, an error correction code (ECC) bit located in an ECC section of a first DRAM memory device or cache memory implementing ECC functionality when the memory element is a memory element of the first DRAM device or a cache memory, or a reserved bit in a second DRAM memory device without an ECC section when the memory element is a memory element of the second DRAM memory device.

4. The method of claim 2, wherein determining whether execution of the process involves attempting to access at least one of the one or more blacklisted bytes located within the memory element comprises:
   determining, in response to a determination that the flag associated with the memory element is set, bytes within the memory element containing the security data based on a location indicator structure associated with the memory element, indicating the locations of the bytes within the memory element.

5. The method of claim 1, further comprising:
   retrieving from another memory device initial data content to store in the memory element;
   determining if the retrieved initial data content includes the security data; and
   in response a determination that the retrieved data content includes the security data:
   reformatting the retrieved initial data content to a resultant reformatted data content comprising re-arranged actual data, re-arranged and re-formatted security data, and location data identifying locations of the security data in the retrieved initial data content; and
setting a bit associated with the memory element to a value indicating the memory element storing the resultant reformatted data includes the security data.

6. The method of claim 5, wherein reformatting the retrieved initial data content comprises:
identifying one or more locations within the retrieved initial data content comprising the security data;
determining, based on values of portions comprising the actual data within the retrieved initial data, a unique sentinel value, different from any of the values of the portions comprising the actual data, to represent the reformatted security data; and
storing at a header portion of the memory element the unique sentinel value and location information identifying the locations of the security data within the retrieved initial data content.

7. The method of claim 5, wherein the memory element includes an L2 level or higher level memory element, and wherein retrieving from the other memory device the initial data content comprises retrieving from an L1 level cache memory the initial data content upon eviction of an L1 cache line containing the initial data content.

8. The method of claim 1, wherein performing one or more remedial actions comprises one or more of: raising an exception, disabling the process, or notifying a user of the potential system violation condition.

9. The method of claim 1, wherein determining whether the data stored in the memory element includes security data comprises:
determining by a hardware-based detection circuit coupled to L1-level cache memory elements whether a bit associated with the memory element is set.

10. The method of claim 1, wherein performing the one or more remedial actions in response to the determination that the execution of the process involves attempting to access the at least one portion of the one or more blacklisted portions comprises:
triggering another process with a higher or same privilege level as a particular privilege level associated with the process, to handle occurrence of the potential system violation condition.

11. The method of claim 10, wherein triggering the other process comprises:
communicating to the other process information about access of the memory element, including one or more of: a program counter value, timing information for the access of the memory element, or other information.

12. The method of claim 1, wherein the security data is stored in one or more memory locations within memory regions allocated for storing data structures.

13. The method of claim 1, further comprising:
controlling the security data stored in the memory element through execution of an instruction set architecture instruction BLOC R1, R2 R3 configured to blacklist memory locations at byte granularity and raise a privileged exception upon misuse of blacklisted locations, wherein R1 represents identity of a first register storing a pointer value pointing to a starting address of the memory element in a virtual address space, R2 represents identity of a second register storing a flag value indicating whether the memory element includes the security data, and R3 represents identity of a third register storing a mask identifying the one or more location in the memory element comprising the security data.

14. The method of claim 1, wherein determining whether execution of the process involves attempting to access the at least one byte of the one or more blacklisted bytes comprises:
determining, according to a location indicator structure associated with the memory element that indicates specific locations, of multiple memory locations within the memory element, that each contains at least a portion of the security data, whether execution of the process involves access of any of the multiple memory locations within the memory element.

15. The method of claim 1, further comprising
determining, when the memory element is located outside the L1 cache, a 1-byte blacklist value that is different from any other 1-byte value stored in non-blacklisted bytes of the memory element; and
setting the sentinel value to be the determined 1-byte blacklist value.

16. The method of claim 1, wherein determining whether the data in the memory element includes security data further comprises:
determining according to a bit-vector map, when the memory element is located in L1 cache memory, locations of blacklisted bytes of the memory element that cause the system violation condition when accessed, and other locations of non-blacklisted bytes of the memory element that are accessible without triggering the system violation condition.

17. A method comprising:
fetching during execution of a process a memory element comprising multiple bytes, wherein at least one of the multiple bytes of the memory element is a blacklisted byte that, if accessed, triggers a system violation condition, and wherein at least another byte of the memory element is not blacklisted and is accessible without triggering a system violation condition;
determining whether data stored in the memory element includes security data in one or more blacklisted bytes located within the memory element that, if the one or more blacklisted bytes are accessed, indicate a potential system violation condition, wherein determining whether the data stored in the memory element includes the security data comprises determining if a flag associated with the memory element is set, and further includes determining locations within the memory element containing the security data, including:
determining according to a bit-vector map, when the memory element is located in L1 cache memory, locations of blacklisted bytes of the memory element that cause the system violation condition when accessed, and other locations of non-blacklisted bytes of the memory element that are accessible without triggering the system violation condition; and
identifying, when the memory element is located outside the L1 cache, the blacklisted bytes within the memory elements that, when accessed cause the system violation condition, hold a sentinel value that is uniquely determined for that memory element based on values of the non-blacklisted bytes of the memory element that are accessible without triggering the system violation condition;
determining, in response to a determination that the memory element includes the one or more blacklisted bytes within the memory element containing the security data, whether execution of the process involves attempting to access at least one byte of the one or more blacklisted bytes located within the memory element;
performing one or more remedial actions in response to a determination that execution of the process involves attempting to access of the at least one byte of the one or more blacklisted bytes located within the memory element; and
permitting access of a non-blacklisted byte of the memory element in response to a determination that execution of the process does not involve attempting to access any of the one or more blacklisted bytes located within the memory element;
wherein determining whether execution of the process involves attempting to access at least one of the one or more blacklisted bytes located within the memory element comprises:
determining, in response to a determination that the flag associated with the memory element is set, bytes within the memory element containing the security data based on the bit-vector, wherein the bit-vector comprises a memory structure with a length in bits corresponding to a number of bytes of the memory element, wherein each of the bits of the memory structure is configured to be set to indicate that a respective byte of the memory element associated with that each of the bits contains at least a portion of the security data.

18. A computing system comprising:
at least one memory device comprising one or more memory elements; and
a controller configured to:
fetch during execution of a process a memory element from the one or more memory elements, the memory element comprising multiple bytes, wherein at least one of the multiple bytes of the memory element is a blacklisted byte that, if accessed, triggers a system violation condition, and wherein at least another byte of the memory element is not blacklisted and is accessible without triggering a system violation condition;
determine whether data stored in the memory element includes security data in one or more blacklisted bytes located within the memory element that, if the one or more blacklisted bytes are accessed, indicate a potential system violation condition, wherein the controller configured to determine whether the data in the memory element includes security data is configured to determine locations within the memory element containing the security data, including to:
identify, when the memory element is located outside the L1 cache, the blacklisted bytes within the memory elements that, when accessed cause the system violation condition, hold a sentinel value that is uniquely determined for that memory element based on values of the non-blacklisted bytes of the memory element that are accessible without triggering the system violation condition;
determine, in response to a determination that the memory element includes the one or more blacklisted bytes within the memory element containing the security data, whether execution of the process involves attempting to access at least one byte of the one or more blacklisted bytes located within the memory element;
perform one or more remedial actions in response to a determination that execution of the process involves attempting to access the at least one byte of the one or more blacklisted bytes located within the memory element; and
permit access of a non-blacklisted portion of the memory element in response to a determination that the execution of the process does not involve attempting to access any of the one or more blacklisted bytes located within the memory element.

19. The system of claim 18, wherein the controller configured to determine whether the data stored in the memory element includes the security data is configured to determine if a flag associated with the memory element is set.

20. The system of claim 19, wherein the flag includes one or more of: a cache overhead bit associated with a cache line in cache memory when the memory element is a cache-line memory element, an error correction code (ECC) bit located in an ECC section of a first DRAM memory device or cache memory implementing ECC functionality when the memory element is a memory element of the first DRAM device or a cache memory, or a reserved bit in a second DRAM memory device without an ECC section when the memory element is a memory element of the second DRAM memory device.

21. The system of claim 19, wherein the controller configured to determine whether execution of the process involves attempting to access at least one of the one or more blacklisted bytes is configured to:
determine, in response to a determination that the flag associated with the memory element is set, bytes within the memory element containing the security data based on a location indicator structure associated with the memory element, indicating the locations of the bytes within the memory element.

22. The system of claim 18, wherein the controller is further configured to:
retrieve from another memory device initial data content to store in the memory element;
determine if the retrieved initial data content includes the security data; and
in response a determination that the retrieved data content includes the security data:
reformat the retrieved initial data content to a resultant reformatted data content comprising re-arranged actual data, re-arranged and re-formatted security data, and location data identifying locations of the security data in the retrieved initial data content; and
set a bit associated with the memory element to a value indicating the memory element storing the resultant reformatted data includes the security data.

23. The system of claim 22, wherein the controller configured to:
reformat the retrieved initial data content is configured to:
identify one or more locations within the retrieved initial data content comprising the security data;
determine, based on values of portions comprising the actual data within the retrieved initial data, a unique sentinel value, different from any of the values of the portions comprising the actual data, to represent the reformatted security data; and
store at a header portion of the memory element the unique sentinel value and location information identifying the locations of the security data within the retrieved initial data content.

24. The system of claim 18, wherein the controller is further configured to:
control the security data stored in the memory element through execution of an instruction set architecture instruction BLOC R1, R2 R3 configured to blacklist memory locations at byte granularity and raise a privileged exception upon misuse of blacklisted locations, wherein R1 represents identity of a first register storing a pointer value pointing to a starting address of the memory element in a virtual address space, R2 represents identity of a second register storing a flag value indicating whether the memory element includes the security data, and R3 represents identity of a third register storing a mask identifying the one or more location in the memory element comprising the security data.

25. A non-transitory computer readable media comprising instructions executable on a processor-based device to:
   fetch during execution of a process a memory element comprising multiple bytes, wherein at least one of the multiple bytes of the memory element is a blacklisted byte that, if accessed, triggers a system violation condition, and wherein at least another byte of the memory element is not blacklisted and is accessible without triggering a system violation condition;
   determine whether data stored in the memory element includes security data in one or more blacklisted bytes located within the memory element that, if the one or more blacklisted bytes are accessed, indicate a potential system violation condition, wherein the computer instructions to determine whether the data in the memory element includes security data include one or more instructions to determine locations within the memory element containing the security data, including to:
      identify, when the memory element is located outside the L1 cache, the blacklisted bytes within the memory elements that, when accessed cause the system violation condition, hold a sentinel value that is uniquely determined for that memory element based on values of the non-blacklisted bytes of the memory element that are accessible without triggering the system violation condition;
   determine, in response to a determination that the memory element includes the one or more blacklisted bytes within the memory element containing the security data, whether execution of the process involves attempting to access at least one byte of the one or more blacklisted bytes located within the memory element;
   perform one or more remedial actions in response to a determination that execution of the process involves attempting to access the at least one byte of the one or more blacklisted bytes located within the memory element; and
   permit access of a non-blacklisted portion of the memory element in response to a determination that the execution of the process does not involve attempting to access any of the one or more blacklisted bytes located within the memory element.

* * * * *